United States Patent
Kim et al.

(10) Patent No.: US 12,022,526 B2
(45) Date of Patent: Jun. 25, 2024

(54) METHOD AND APPARATUS FOR PERFORMING RANDOM ACCESS PROCEDURE IN WIRELESS COMMUNICATION SYSTEM

(71) Applicant: LG Electronics Inc., Seoul (KR)

(72) Inventors: Jaehyung Kim, Seoul (KR); Youngdae Lee, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/164,270

(22) Filed: Feb. 3, 2023

(65) Prior Publication Data

US 2023/0189348 A1 Jun. 15, 2023

Related U.S. Application Data

(63) Continuation of application No. PCT/KR2022/014779, filed on Sep. 30, 2022.

(30) Foreign Application Priority Data

Oct. 1, 2021 (KR) .................. 10-2021-0131181
Oct. 1, 2021 (KR) .................. 10-2021-0131188

(51) Int. Cl.
*H04W 74/08* (2009.01)
*H04W 74/00* (2009.01)
*H04W 74/0833* (2024.01)

(52) U.S. Cl.
CPC ..... *H04W 74/0833* (2013.01); *H04W 74/006* (2013.01); *H04W 74/0866* (2013.01)

(58) Field of Classification Search
CPC ............. H04W 72/23; H04W 74/0833; H04W 74/066
See application file for complete search history.

(56) References Cited

U.S. PATENT DOCUMENTS 11,601,981 B2 * 3/2023 Ly ..................... H04W 72/23
2019/0363843 A1 * 11/2019 Gordaychik ............ H04L 1/08
(Continued)

FOREIGN PATENT DOCUMENTS

WO   WO 2020/166891    8/2020
WO   WO 2021/190510    9/2021

OTHER PUBLICATIONS

Ericsson), "FL summary on RAN1 RRC parameter list for RedCap," R1-2108669, Presented at 3GPP TSG-RAN WG1 Meeting #106-e, e-Meeting, Aug. 16-27, 2021, 4 pages.
(Continued)

*Primary Examiner* — Liton Miah
(74) *Attorney, Agent, or Firm* — Fish & Richardson P.C.

(57) ABSTRACT

A method and a device for performing a random access procedure in a wireless communication system. A method of performing a random access procedure according to an embodiment of the present disclosure may include receiving, from a base station, first configuration information related to uplink (UL) transmission and second configuration information related to downlink (DL) transmission, wherein the first configuration information includes information regarding an initial UL bandwidth part (BWP) and the second configuration information includes information regarding an initial DL BWP; transmitting, to the base station, a first message for the random access procedure on the initial UL BWP; and receiving from the base station, a second message for the random access procedure on the initial DL BWP in response to the first message.

5 Claims, 16 Drawing Sheets

(56) References Cited

U.S. PATENT DOCUMENTS

| | | | |
|---|---|---|---|
| 2020/0205202 A1* | 6/2020 | Takahashi | H04W 16/28 |
| 2021/0037573 A1 | 2/2021 | Ly et al. | |
| 2022/0338265 A1* | 10/2022 | Lei | H04W 72/044 |
| 2023/0074775 A1* | 3/2023 | Lei | H04L 5/14 |
| 2023/0095857 A1* | 3/2023 | Agiwal | H04W 72/51 370/329 |

OTHER PUBLICATIONS

Oppo, "Discussion on reduced UE bandwidth," R1-2104782, Presented at 3GPP TSG RAN WG1 #105-e, e-Meeting, May 10-27, 2021, 12 pages.

Moderator (Ericsson), "FL summary #6 on reduced maximum UE bandwidth for RedCap," R1-2108498, 3GPP TSG-RAN WG1 Meeting #106-c, c-meeting, dated Aug. 16-27, 2021, 143 pages.

Office Action in Korean Appln. No. 10-2023-7000536, mailed on Apr. 14, 2023, 8 pages (with English translation).

Moderator (AT&T), "Feature Lead Summary #1 of 8.10.1," 3GPP TSG RAN WG1 #106-e, R1-2108277, e-Meeting, Aug. 16-27, 2021, 27 pages.

Moderator (Ericsson), "FL summary #7 on reduced maximum UE bandwidth for RedCap," 3GPP Tsg-Ran WG1 Meeting #106-e, R1-2108632, e-Meeting, Aug. 16-27, 2021, 143 pages.

Notice of Allowance in Korean Appln. No. 10-2023-7000536, mailed on Jan. 18, 2024, 14 pages (with English translation).

Office Action in Japanese Appln. No. 2023-515313, mailed on Dec. 5, 2023, 4 pages (with English translation).

Spreadtrum Communications, "Discussion on aspects related to reduced maximum UE bandwidth," 3GPP TSG RAN WG1 #106-e, R1-2106705, e-Meeting, Aug. 16-27, 2021, 15 pages.

Vivo, Guangdong Genius, "Discussion on reduced number of Rx branches," 3GPP TSG RAN WG1#106-e, R1-2106602, e-Meeting, Aug. 16-27, 2021, 3 pages.

ZTE, Sanechips, "Bandwidth reduction for reduced capability NR devices," 3GPP TSG RAN WG1 #106-e, R1-2106841, e-Meeting, Aug. 16-27, 2021, 7 pages.

* cited by examiner

METHOD AND APPARATUS FOR PERFORMING RANDOM ACCESS PROCEDURE IN WIRELESS COMMUNICATION SYSTEM

CROSS-REFERENCE TO RELATED APPLICATIONS

This application is a continuation of International Application No. PCT/KR2022/014779, filed on Sep. 30, 2022, which claims the benefit of Korean Application Nos. 10-2021-0131181, filed on Oct. 1, 2021, and 10-2021-0131188, filed on Oct. 1, 2021. The disclosures of the prior applications are incorporated by reference in their entirety.

TECHNICAL FIELD

The present disclosure relates to a wireless communication system, and in more detail, relates to a method and a device of performing a random access procedure in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device of performing a random access procedure for a specific type of terminal (e.g., reduced capability UE).

In addition, a technical problem of the present disclosure is to provide a method and a device of configuring a downlink/uplink frequency bandwidth part (BWP) for a specific type of terminal (e.g., reduced capability UE) for a random access procedure or paging reception, etc.

The technical objects to be achieved by the present disclosure are not limited to the above-described technical objects, and other technical objects which are not described herein will be clearly understood by those skilled in the pertinent art from the following description.

In a method of performing a random access procedure in a wireless communication system according to an aspect of the present disclosure, the method performed by a reduced capability (redcap) UE may include: receiving, from a base station, first configuration information related to uplink (UL) transmission and second configuration information related to downlink (DL) transmission, wherein the first configuration information includes information on an initial UL bandwidth part (BWP) and the second configuration information includes information on an initial DL BWP; transmitting, to the base station, a first message for the random access procedure on the initial UL BWP; and receiving, from the base station, a second message for the random access procedure on the initial DL BWP in response to the first message. For an unpaired spectrum operation, regardless of whether the initial UL BWP and the initial DL BWP are configured for the redcap UE, a center frequency of the initial DL BWP may be configured to be the same as a center frequency of the initial UL BWP.

In a method of performing a random access procedure in a wireless communication system according to another aspect of the present disclosure, the method performed by a base station may include: transmitting, to a reduced capability (redcap) UE, first configuration information related to uplink (UL) transmission and second configuration information related to downlink (DL) transmission, wherein the first configuration information includes information on an initial UL bandwidth part (BWP) and the second configuration information includes information on an initial DL BWP; receiving, from the redcap UE, a first message for the random access procedure on the initial UL BWP; and transmitting, to the redcap UE, a second message for the random access procedure on the initial DL BWP in response to the first message. For an unpaired spectrum operation, regardless of whether the initial UL BWP and the initial DL BWP are configured for the redcap UE, a center frequency of the initial DL BWP may be configured to be the same as a center frequency of the initial UL BWP.

According to an embodiment of the present disclosure, an operation of a specific type of terminal (e.g., reduced capability UE) such as a random access procedure, etc. may be smoothly supported.

In addition, according to an embodiment of the present disclosure, although a specific type of terminal (e.g., reduced capability UE) and a non-specific type of terminal (e.g., non-reduced capability UE) coexist, it is possible to prevent a fragmentation problem of an uplink resource or a problem in which an initial uplink/downlink BWP exceeds a bandwidth of a specific type of terminal (e.g., reduced capability UE).

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
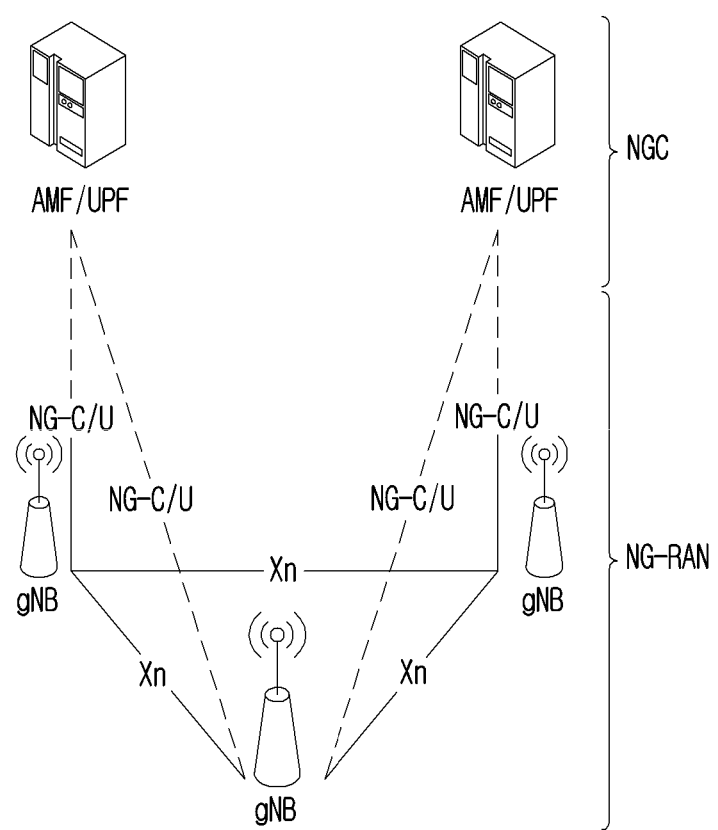
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
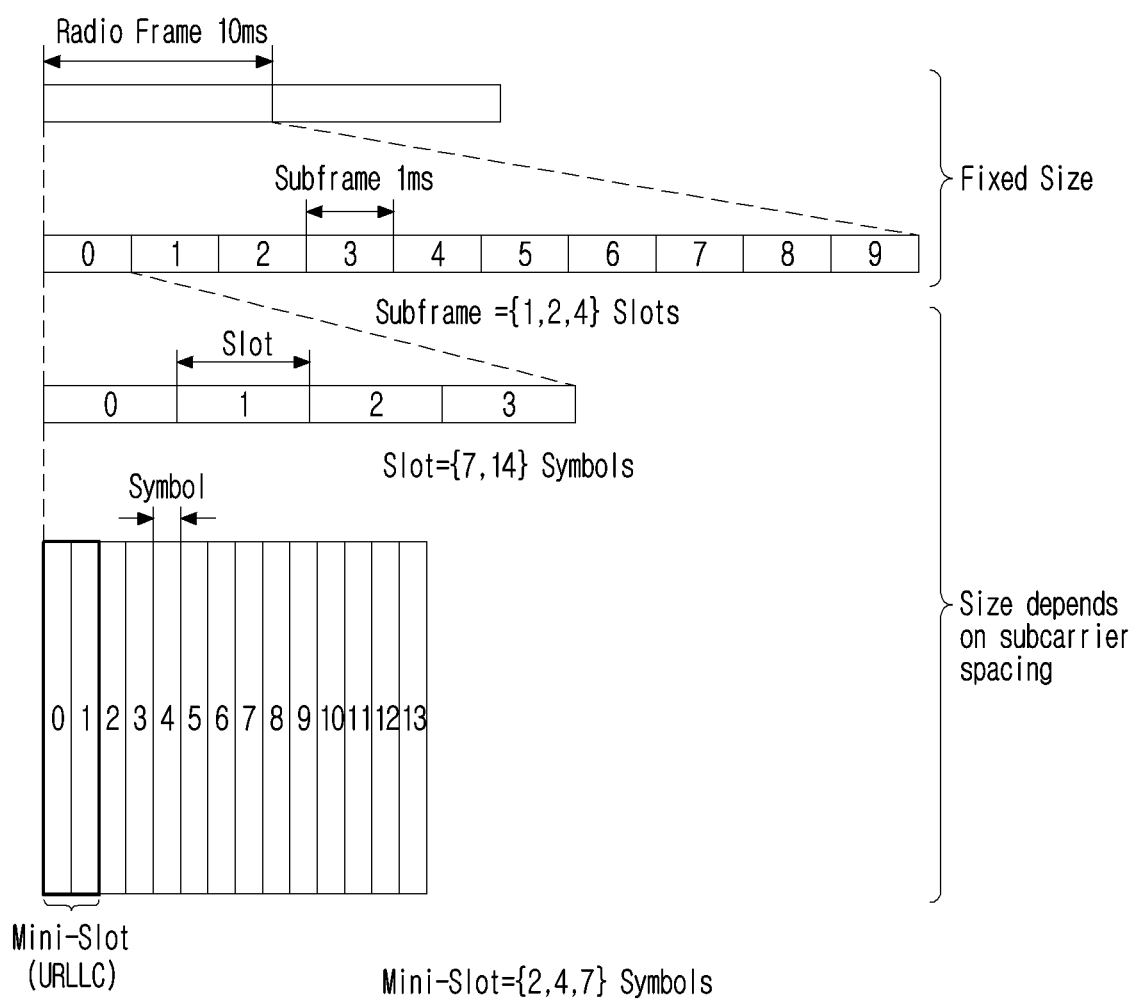
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480-103 Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi colocation) relationship. In this case, the large-scale property includes at least one of delay spread, doppler spread, frequency shift, average received power, received timing.

Figure 3:
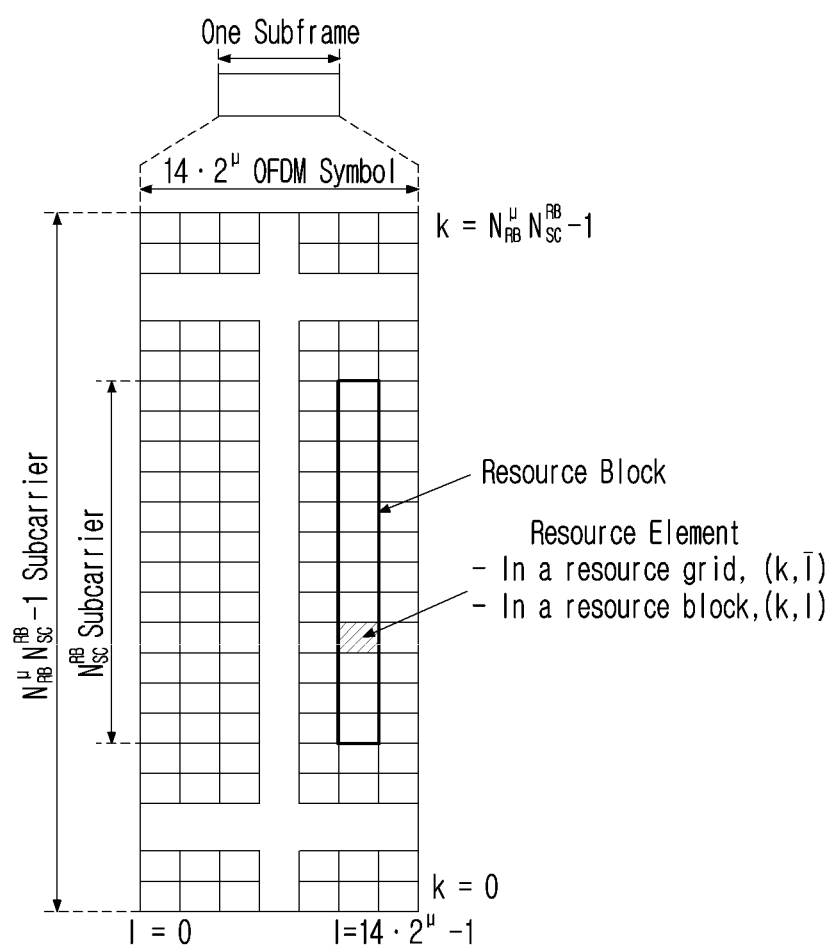
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$.

When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{Equation 1}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{Equation 2}$$

$N_{BWP,i}^{start,\mu}$ is a common resource block that a BWP starts relatively to common resource block 0.

Figure 4:
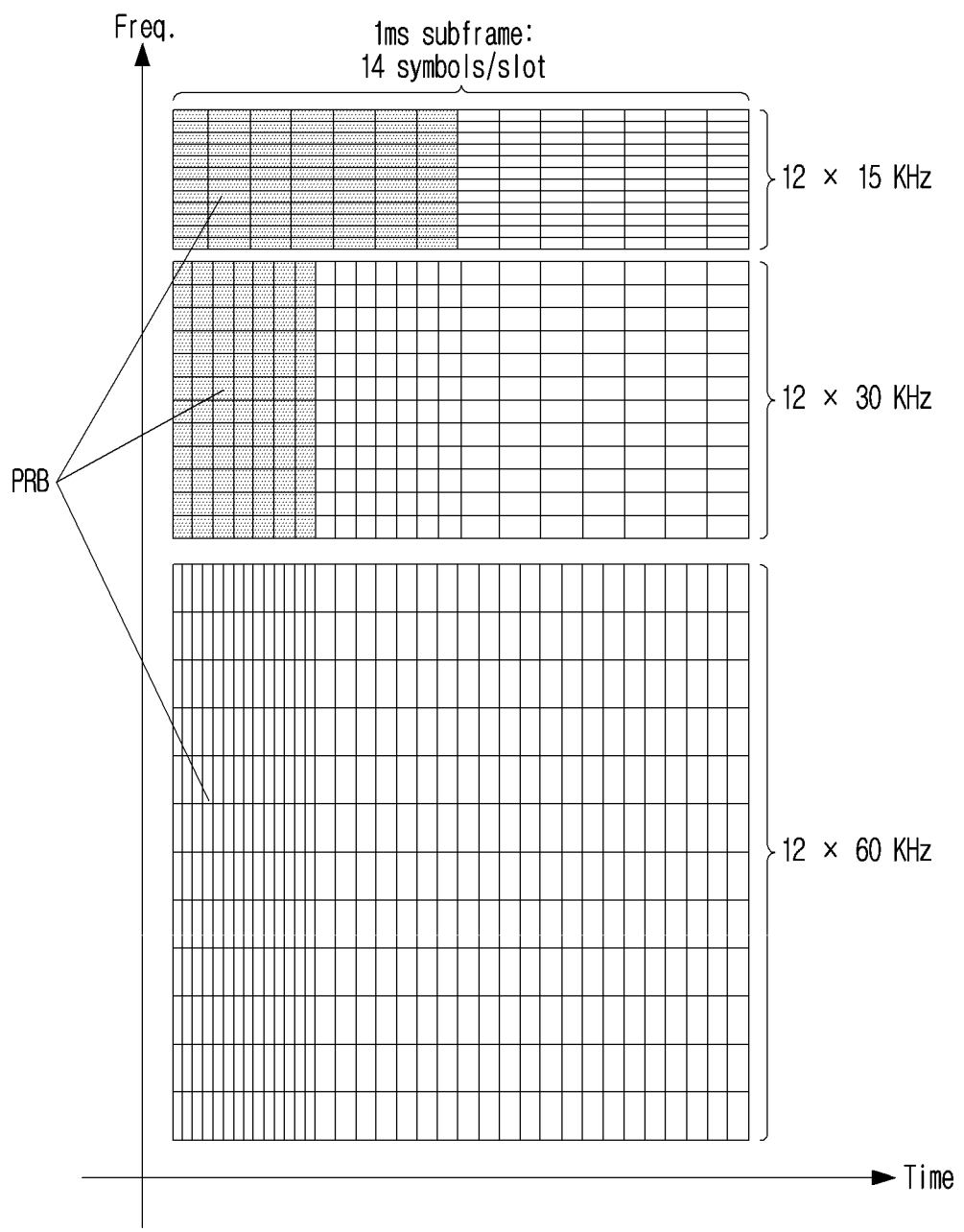
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
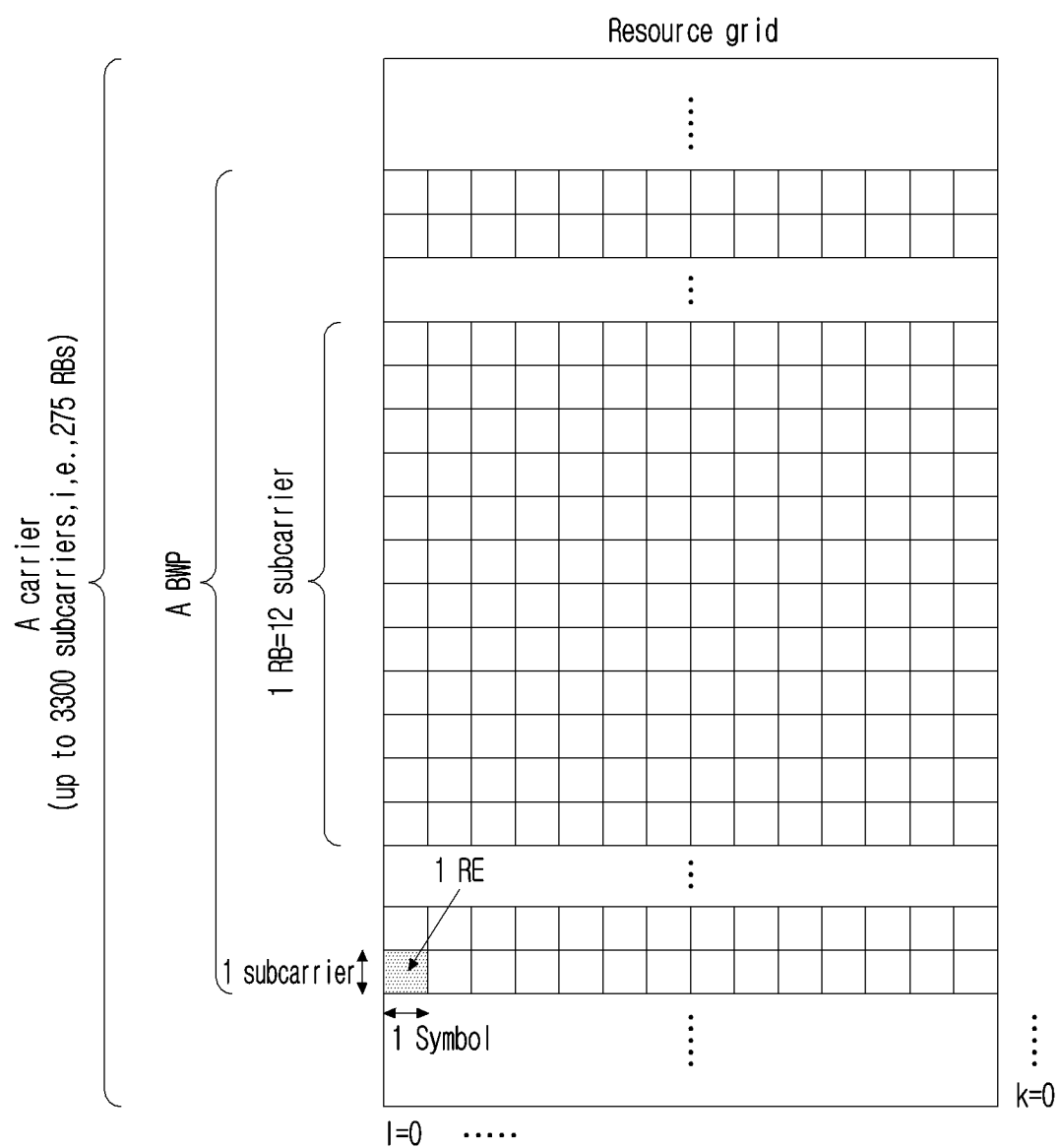
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
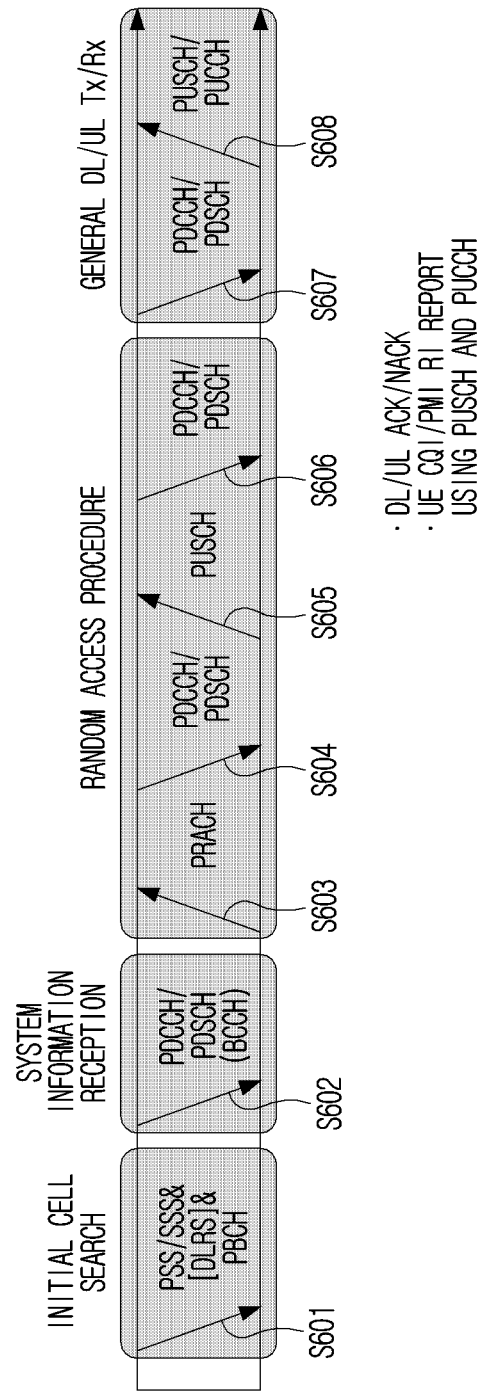
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

System Information Acquisition

Figure 7:
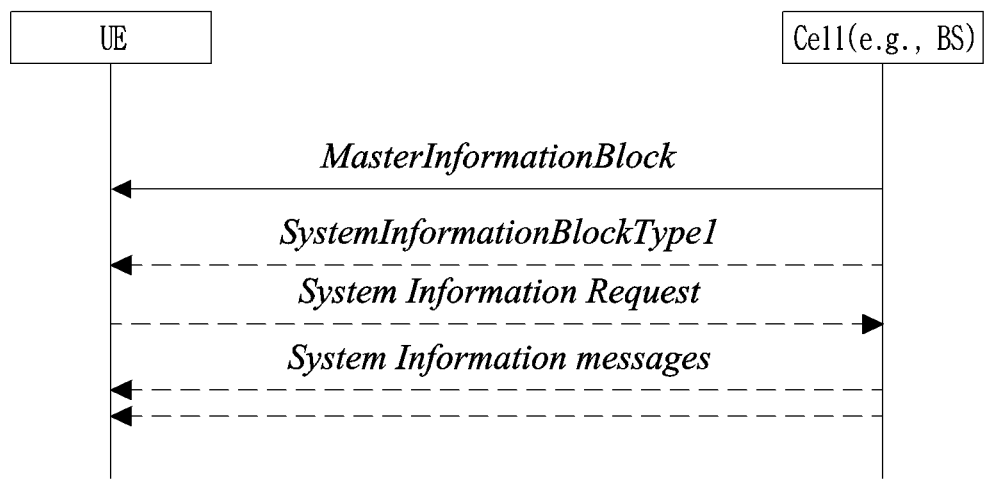
FIG. 7 illustrates a process of acquiring system information.

FIG. 7 illustrates a system information acquisition process.

A UE may obtain access stratum (AS)/non-access stratum (NAS) information through a system information (SI) acquisition process. A SI acquisition process may be applied to a UE in an RRC idle (RRC_IDLE) state, an RRC inactive (RRC_INACTIVE) state, and an RRC connected (RRC_CONNECTED) state.

SI is divided into a master information block (MIB) and a plurality of system information blocks (SIB). SI other than an MIB may be referred to as Remaining Minimum System Information (RMSI) and Other System Information (OSI). RMSI corresponds to SIB1, and OSI refers to SIBs other than SIB2 and higher than SIB2. For details, the following may be referenced.

An MIB includes information/parameters related to SIB1 (SystemInformationBlockType1) reception and is transmitted through a PBCH of an SSB (SS/PBCH block). MIB information may include fields shown in Table 6.

Table 6 illustrates a portion of an MIB.

TABLE 6

| - subCarrierSpacingCommon {scs15or60, scs30or120}, | ENUMERATED |
|---|---|
| - ssb-SubcarrierOffset | INTEGER (0..15), |
| - pdcch-ConfigSIB1 (0..255), | INTEGER |

Table 7 illustrates a description of MIB fields illustrated in Table 6.

TABLE 7 pdcch-ConfigSIB1
The field pdcch-ConfigSIB1 determines a common ControlResourceSet (CORESET), a common search space and necessary PDCCH parameters.
If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1
ssb-SubcarrierOffset.
The field ssb-SubcarrierOffset corresponds to k SSB, which is the frequency domain offset (number of subcarriers) between SSB and the overall resource block grid.
The value range of the field ssb-SubcarrierOffset may be extended by an additional most significant bit encoded within PBCH.
The field ssb-SubcarrierOffset may indicate that this cell does not provide SIB1 and that there is hence no CORESET#0 configured in MIB. In this case, the field pdcch-ConfigSIB1 may indicate the frequency positions where the UE may (not) find a SS/PBCH with a control resource set and search space for SIB1.
subCarrierSpacingCommon
The field subCarrierSpacingCommon indicates subcarrier spacing for SIB1, Msg.2/4 and MsgB for initial access, paging and broadcast Si-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

Upon initial cell selection, a UE assumes that half-frames with an SSB are repeated in a period of 20 ms. A UE may check whether a Control Resource Set (CORESET) exists for the Type0-PDCCH common search space based on an MIB. The Type0-PDCCH common search space is a type of PDCCH search space and is used to transmit a PDCCH for scheduling an SI message. When the Type0-PDCCH common search space exists, a UE may determine (i) a plurality of contiguous RBs and one or more contiguous symbols constituting a CORESET and (ii) a PDCCH occasion (i.e., time domain location for PDCCH reception) based on information in an MIB (e.g., pdcch-ConfigSIB1). Specifically, pdcch-ConfigSIB1 is 8-bit information, (i) is determined based on 4 bits of MSB (Most Significant Bit) (refer to 3GPP TS 38.213 Table 13-1-13-10), and (ii) is determined based on 4 bits of LSB (Least Significant Bit) (refer to 3GPP TS 38.213 Table 13-11-13-15).

As an example, information indicated by MSB 4 bits of pdcch-ConfigSIB1 is exemplified as follows.

A configuration of a CORESET for the Type0-PDCCH common search space is:

i) Define multiple tables according to subcarrier spacing and channel minimum bandwidth.

ii) Indicates a multiplexing pattern between an SS/PBCH block and a PDCCH/PDSCH.
  Pattern 1: All SCS combinations for FR1, all SCS combinations for FR2
  Pattern 2: Different SCS combinations for FR2 (except for the combination of 60 kHz for an initial DL BWP and 240 kHz SCS for a SS/PBCH block)
  Pattern 3: Same SCS combination for FR2 (for 120 kHz SCS)

iii) indicates the number of PRBs and OFDM symbols for a CORESET.
  $N_{RB}^{CORESET}$: number of RBs (i.e. {24, 48, 96})
  $N_{Symb}^{CORESET}$: number of symbols (i.e. {1, 2, 3})

iv) Indicates an offset (the number of RBs) between the first RB of an SS/PBCH block and the first RB of an RMSI CORESET.

A range of an offset (number of RBs) is determined by the number of PRBs and sync raster0.

Design to align a center of an SS/PBCH block and a center of an RMSI CORESET as close as possible.

When the Type0-PDCCH common search space does not exist, pdcch-ConfigSIB1 provides information on a frequency location where an SSB/SIB1 exists and a frequency range where an SSB/SIB1 does not exist.

In the case of initial cell selection, a UE may assume that a half frame with an SS/PBCH block occurs with a period of 2 frames. Upon detection of an SS/PBCH block, if $k_{SSB} \leq 23$ for FR1 (Sub-6 GHz; 450 to 6000 MHz) and $k_{SSB} \leq 11$ for FR2 (mm-Wave, 24250 to 52600 MHz), a UE determines that a control resource set for the Type0-PDCCH common search space exists. If $k_{SSB} > 23$ for FR1 and $k_{SSB} > 11$ for FR2, a UE determines that a control resource set for the Type0-PDCCH common search space does not exist. $k_{SSB}$ represents a frequency/subcarrier offset between subcarrier 0 of an SS/PBCH block and subcarrier 0 of a common resource block for an SSB. For FR2, only a maximum of 11 values can be applied. $k_{SSB}$ can be signaled through an MIB. An SIB1 includes information related to availability and scheduling (e.g., transmission period, SI-window size) of the remaining SIBs (hereinafter, SIBx, where x is an integer greater than or equal to 2). For example, an SIB1 may inform whether SIBx is periodically broadcast or provided at a request of a UE by an on-demand scheme. When SIBx is provided by an on-demand method, an SIB1 may include information necessary for a UE to perform an SI request. An SIB1 is transmitted through a PDSCH, a PDCCH scheduling the SIB1 is transmitted through the Type0-PDCCH common search space, and the SIB1 is transmitted through a PDSCH indicated by a PDCCH.

SIBx is included in an SI message and transmitted through a PDSCH. Each SI message is transmitted within a periodically occurring time window (i.e., SI-window).

Random Access Operation and Related Operation

When there is no PUSCH transmission resource (i.e., uplink grant) allocated by a base station, a UE may perform a random access operation. Random access of the NR system may be initiated 1) when a UE requests or resumes an RRC connection, 2) when a UE performs handover to a neighboring cell or adds a secondary cell group (SCG) (i.e., SCG addition), 3) When a UE perform a scheduling request to a base station, 4) when a base station indicates to a UE random access with a PDCCH order, 5) when a beam failure or RRC connection failure is detected.

Figure 8A:
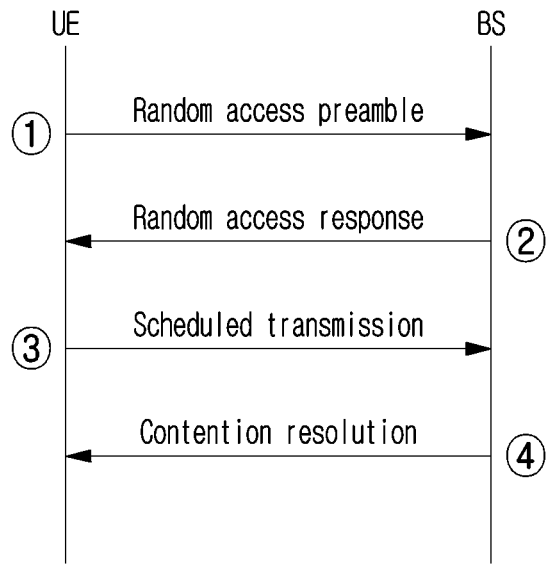
FIGS. 8A and 8B represent a random access process in a wireless communication system to which the present disclosure may be applied.
Figure 8B:
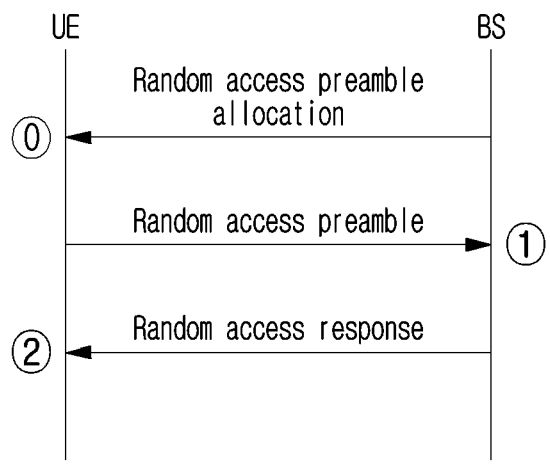

FIGS. 8A and 8B illustrate a random access process in a wireless communication system to which the present disclosure may be applied. FIG. 8A exemplifies a contention-based random access process, and FIG. 8B exemplifies a dedicated random access process.

Referring to FIG. 8A, a contention-based random access process includes the following 4 steps. Hereinafter, messages transmitted in steps 1 to 4 may be referred to as messages (Msg) 1 to 4, respectively.

Step 1: A UE transmits a random access channel (RACH) preamble through a physical random access channel (PRACH).

Step 2: A UE receives a random access response (RAR) from a base station through a downlink shared channel (DL-SCH).

Step 3: A UE transmits a Layer 2/Layer 3 message to a base station through an uplink shared channel (UL-SCH).

Step 4: A UE receives a contention resolution message from a base station through a DL-SCH.

A UE may receive information on random access from a base station through system information.

If random access is required, a UE transmits an RACH preamble to a base station as in step 1. A base station can distinguish each of random access preambles through a time/frequency resource through which an random access preamble is transmitted (i.e., RACH occasion (RO)) and a random access preamble index (PI).

When a base station receives a random access preamble from a terminal, the base station transmits a random access response (RAR) message to the terminal as in step 2. For reception of a random access response message, in a pre-configured time window (e.g., ra-ResponseWindow), a UE monitors a CRC-masked L1/L2 control channel (PDCCH) with an RA-RNTI (Random Access-RNTI), which includes scheduling information for a random access response message. A PDCCH masked with an RA-RNTI can be transmitted only through a common search space. When receiving a scheduling signal masked with an RA-RNTI, a UE may receive a random access response message from a PDSCH indicated by scheduling information. After that, a terminal checks whether there is random access response information indicated to it in a random access response message. Whether or not random access response information indicated to a UE exists can be confirmed by whether a random access preamble ID (RAPID) for a preamble transmitted by a terminal exists. An index of a preamble transmitted by a UE and a RAPID may be the same. Random access response information includes a corresponding random access preamble index, timing offset information for UL synchronization (e.g., timing advance command (TAC)), UL scheduling information for message 3 transmission (e.g., UL grant), and UE temporary identification information (e.g., TC-RNTI (Temporary-C-RNTI)).

A UE receiving random access response information transmits UL-SCH (Shared Channel) data (message 3) through a PUSCH according to UL scheduling information and a timing offset value, as in step 3. A time and frequency resource in which a PUSCH carrying message 3 is mapped/transmitted is defined as PO (PUSCH Occasion). Message 3 may include a UE's ID (or a UE's global ID). Alternatively, message 3 may include RRC connection request-related information (e.g., an RRCSetupRequest message) for initial access. Message 3 may also include a Buffer Status Report (BSR) on an amount of data available for transmission by a UE.

After receiving UL-SCH data, as in step 4, a base station transmits a contention resolution message (message 4) to a UE. When a UE receives a contention resolution message and contention is successfully resolved, a TC-RNTI is changed to a C-RNTI. Message 4 may include an ID of a UE and/or RRC connection related information (e.g., RRCSetup message). If information transmitted through message 3 and information received through message 4 do not match, or if message 4 is not received for a certain period of time, a UE may determine that contention resolution has failed and retransmit message 3.

Referring to FIG. 8B, a dedicated random access process includes the following three steps. Hereinafter, messages transmitted in steps 0 to 2 may be referred to as messages (Msg) 0 to 2, respectively. A dedicated random access process may be triggered by using a PDCCH (hereinafter referred to as a PDCCH order) for instructing RACH preamble transmission by a base station.

Step 0: A base station allocates a RACH preamble to a terminal through dedicated signaling.

Step 1: A UE transmits a RACH preamble through a PRACH.

Step 2: A UE receives a random access response (RAR) from a base station through a DL-SCH.

Operations of steps 1 to 2 of a dedicated random access process may be the same as steps 1 to 2 of a contention-based random access process.

In NR, DCI format 1_0 is used to initiate a non-contention based random access procedure with a PDCCH order. DCI format 1_0 is used to schedule a PDSCH in one DL cell. Meanwhile, when a Cyclic Redundancy Check (CRC) of DCI format 1_0 is scrambled with a C-RNTI and all bit values of a "Frequency domain resource assignment" field are 1, DCI format 1_0 is used as a PDCCH order indicating a random access process. In this case, fields of DCI format 1_0 are configured as follows.

RA preamble index: 6 bits

UL/SUL (Supplementary UL) indicator: 1 bit. When all bit values of a RA preamble index are not 0 and SUL is configured in a cell for a UE, a PRACH in a cell indicates a transmitted UL carrier. Otherwise, it is unused (reserved).

SSB (Synchronization Signal/Physical Broadcast Channel) index: 6 bits. When all bit values of a RA preamble index are not 0, it indicates an SSB used to determine a RACH occasion for PRACH transmission. Otherwise, it is unused (reserved).

PRACH mask index: 4 bits. When all bit values of a RA preamble index are not 0, a RACH occasion associated with an SSB indicated by an SSB index is indicated. Otherwise, it is unused (reserved).

reserved: 10 bits

When DCI format 1_0 does not correspond to a PDCCH order, DCI format 1_0 is configured with fields used for scheduling a PDSCH (e.g., Time domain resource assignment (TDRA), Modulation and Coding Scheme (MCS), HARQ process number, PDSCH-to-HARQ_feedback timing indicator, etc.).

In NR systems, lower latency than existing systems may be required. In addition, if a random access process occurs in a U-band, a random access process is terminated and contention is resolved only when a UE and a base station sequentially succeed in LBT in all of a 4-step random access process. If LBT fails in any step of a 4-step random access process, resource efficiency is lowered and latency is increased. In particular, if LBT fails in a scheduling/transmission process associated with Message 2 or Message 3, resource efficiency reduction and latency increase may occur significantly. Even in an L-band random access process, a low-latency random access process may be required in various scenarios of the NR system. Therefore, a 2-step random access process can also be performed on an L-band.

Figure 9A:
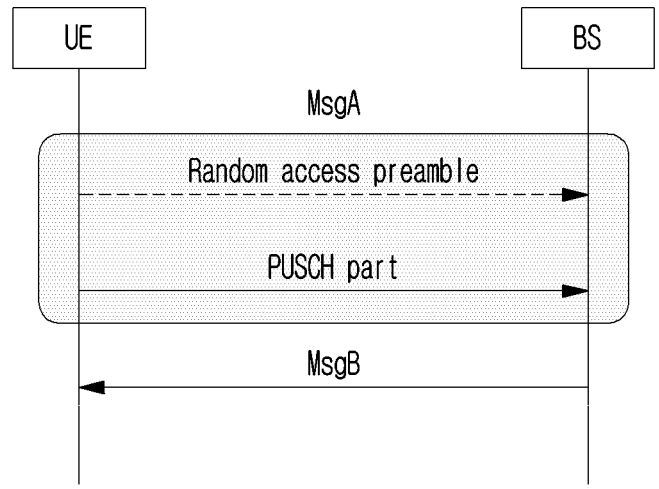
FIGS. 9A and 9B represent a 2-step random access process in a wireless communication system to which the present disclosure may be applied.
Figure 9B:
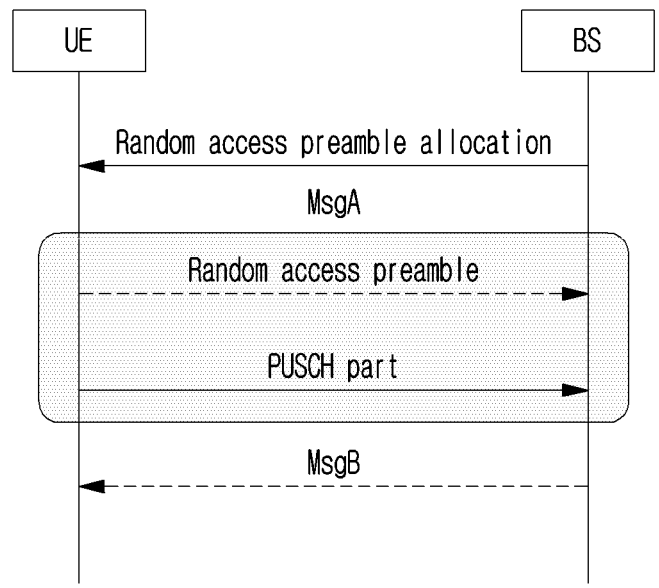

FIGS. 9A and 9B illustrate a two-step random access process in a wireless communication system to which the present disclosure may be applied.

As shown in FIG. 9A, a 2-step random access process may include two steps of transmitting an uplink signal (referred to as message A and corresponds to PRACH preamble+Msg3 PUSCH) from a UE to a base station and transmitting a downlink signal (referred to as message B and corresponding to RAR+Msg4 PDSCH) from a base station to a UE.

Also, in a non-contention random access process, as shown in FIG. 9B, a random access preamble and a PUSCH part may be transmitted together.

Although not shown in FIGS. 9A and 9B, a PDCCH for scheduling message B may be transmitted from a base station to a UE, which may be referred to as Msg. B PDCCH.

Method of Configuring an Initial BWP for a Reduced Capability (RedCap) UE

Terms that may be used in this disclosure are defined as follows.

BWP: BandWidth Part (may be composed of continuous resource blocks (RBs) on a frequency axis. It may correspond to one numerology (e.g., SCS, CP length, slot/mini-slot duration, etc.). In addition, multiple BWPs may be configured in one carrier (the number of BWPs per carrier may also be limited), but the number of activated BWPs may be limited to a part (e.g., one) per carrier.
  SS: search space
  CORESET: control resource set (COntrol REsourse SET) (means a time-frequency resource region in which a PDCCH can be transmitted, and the number of CORESETs per BWP may be limited.)
  Type0-PDCCH CSS (common search space) set: A search space set in which an NR UE monitors a set of PDCCH candidates for a DCI format with a CRC scrambled by an SI-RNTI
  CORESET #0: CORESET for Type0-PDCCH CSS set for an NR UE (configured in MIB)
  MO: PCCH monitoring occasion (e.g., for Type0-PDCCH CSS set)
  SIB1-R: This is (additional) SIB1 for a RedCap UE, and may be limited to a case where it is generated as a TB separate from an SIB1 and transmitted through a separate PDSCH.
  CORESET #0-R: CORESET #0 for a RedCap UE
  Type0-PDCCH-R CSS set: A search space set in which a RedCap UE monitors a set of PDCCH candidates for a DCI format with a CRC scrambled by an SI-RNTI
  MO-R: PCCH monitoring occasion (e.g., for Type0-PDCCH-R CSS set)
  Cell defining SSB (CD-SSB: Cell defining SSB): RMSI scheduling information among an NR SSB
  Non-cell defining SSB (non-CD-SSB: Non-cell defining SSB): An SSB that is placed in the NR sync raster, but does not include RMSI scheduling information of a cell for measurement. However, information indicating a location of a CD-SSB may be included.
  SCS: subcarrier spacing
  SI-RNTI: A system Information Radio-Network Temporary Identifier
  Camp on: "Camp on" is a UE state in which a UE is ready to stay in a cell and start a potential dedicated service or receive an ongoing broadcast service
  TB: Transport Block
  RSA (Redcap standalone): A cell that supports only Redcap devices or services
  IE: Information Element
  RO: RACH Occasion
  QCL: Quasi-Co-Location (The QCL relationship between two reference signals (RS) may mean that a QCL parameter such as Doppler shift, Doppler spread, average delay, delay spread, spatial Rx parameter, etc. obtained from one RS can also be applied to another RS (or antenna port(s) of the corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For certain DL RS antenna port(s), a first DL RS may be configured as a reference for QCL type X (X=A, B, C, or D), and a second DL RS may be configured as a reference for QCL type Y (Y=A, B, C, or D, but X≠Y)).
  TCI: Transmission Configuration Indication (One TCI state includes a QCL relationship between DM-RS ports of a PDSCH, DM-RS ports of a PDCCH, or CSI-RS port(s) of CSI-RS resources and one or more DL RSs. For 'Transmission Configuration Indication' among fields in DCI that schedules a PDSCH, a TCI state index corresponding to each code point constituting the corresponding field is activated by a MAC control element (CE), TCI state configuration for each TCI state index is configured through RRC signaling. In the Rel-16 NR system, a corresponding TCI state is configured between DL RSs, but configuration between a DL RS and a UL RS or between a UL RS and a UL RS may be allowed in a future release. Examples of a UL RS include an SRS, a PUSCH DM-RS, a PUCCH DM-RS, etc.)
  TRP: Transmission and Reception Point
  RACH: Random Access Channel
  RAR: Random Access Response
  Msg3: This is a message transmitted through an uplink shared channel (UL-SCH) including a C-RNTI MAC CE or common control channel (CCCH) service data unit (SDU), provided from a higher layer, and associated with a UE Contention Resolution Identity as part of a random access procedure.
  Special Cell: In case of dual connectivity operation, the term Special Cell indicates a PCell of MCG or a PSCell of SCG depending on whether a MAC entity is associated with a master cell group (MCG) or secondary cell group (SCG), respectively. Otherwise, the term Special Cell refers to PCell. Special Cell supports PUCCH transmission and contention-based random access and is always active.
  Serving Cell: includes PCell, PSCell, and secondary cell (SCell).

Recently, in addition to major 5G use cases (mMTC, eMBB, and URLLC), importance/interest in use case areas spanning mMTC and eMBB or mMTC and URLLC is increasing. Accordingly, need for a UE to efficiently support these use cases in terms of device cost, power consumption, form factor, etc. is increasing. In the present disclosure, a UE for this purpose is referred to as a NR reduced capability (redcap) UE/device, or (NR) redcap UE/device for short. In addition, a normal NR terminal that supports all or one or more of 5G main use cases, as distinguished from a redcap device, is referred to as NR (normal) UE/device. An NR UE may be a terminal equipped with all of the 5G key capabilities (peak data rate, user experienced data rate, latency, mobility, connection density, energy efficiency, spectrum efficiency, area traffic efficiency, etc.) defined in IMT-2020, and a redcap UE may be a UE in which some capabilities are intentionally reduced in order to achieve device cost, power consumption, and small form factor.

A 5G use case area spanning mMTC and eMBB, or mMTC and URLLC, which are target use cases of a Redcap device, is referred to as redcap use cases for convenience in this disclosure. Redcap use cases can be, for example:

i) Connected Industries
   Sensors and actuators are connected to 5G networks and core.
   Includes large-scale industrial wireless sensor network (IWSN) use cases and requirements
   Relatively low-end services requiring small device form factors with several years of battery life as well as URLLC services with very high requirements.
   The requirements for these services are higher than low power wireless area (LPWA) (i.e., LTE-M/NB-IOT) but lower than URLCC and eMBB.
   Devices in this environment include, for example, pressure sensors, humidity sensors, thermometers, motion sensors, accelerometers, actuators, etc.

ii) Smart City
   Smart city vertical includes data collection and processing to more efficiently monitor and control city resources and provide services to city residents.
   In particular, a deployment of surveillance cameras is not only an essential part of a smart city, but also an essential part in factories and industries.

iii) Wearables
   Wearable use cases include smart watches, rings, eHealth-related devices, and medical monitoring devices.
   One feature of the use case is a small size of a device.

Redcap use cases may be not support in terms of bit rate, latency, etc. by low power wireless area (LPWA) UEs (e.g., LTE-M, NB-IoT, etc.). NR UEs may be supported functionally, but may be inefficient in terms of terminal manufacturing cost, form factor, and battery life. Supporting the above use case area in the 5G network as a redcap UE having characteristics such as low cost, low power, and small form factor can reduce manufacturing and maintenance costs of the UE.

Redcap use cases have quite diverse requirements in terms of UE complexity, target bit rate, latency, power consumption, etc., in the present disclosure, requirements that a redcap UE should satisfy are referred to as redcap requirements. Redcap requirements can be divided into generic requirements commonly applied to all redcap use cases and use case specific requirements applied only to some use case(s).

Redcap requirements may be satisfied by (a combination of) various features provided by a UE and a base station. The following is an example of features and sub-features supported by a UE/base station to satisfy redcap requirements.

i) Complexity Reducing Features
   Reducing the number of UE RX/TX antennas
   UE bandwidth reduction
   half-duplex FDD
   Relaxed UE processing time
   Relaxed UE processing functions ii) Power Saving
   Reduce PDCCH monitoring with a small number of blind decoding (BD) and control resource element (CCE) restrictions
   extended discontinuous reception (DRX) for RRC Deactivation/Inactive and/or Idle
   radio resource management (RRM) for stationary devices iii) Coverage Recovery/Enhancement The above redcap use cases may define and support one or a plurality of UEs, and the present disclosure considers both of the following cases.
   Case A) Redcap use cases are supported in the form of a single UE (in the case of a single device type)
   Case B) Redcap use cases are supported in the form of multiple UEs (in case of multiple device types)

In Case A), a redcap UE may be a UE that satisfies all of the above redcap requirements, that is, both generic and use case specific requirements, and may also be a UE that supports all redcap use cases. In this case, since various requirements must be satisfied at the same time, there may be a factor of cost increase due to increase in UE complexity, but at the same time, cost reduction effect by mass production according to use case expansion can be expected. Case B) may be a case in which a UE type is defined and supported for each redcap use case in consideration of the fact that the redcap use case requirements are quite diverse. Even in this case, all of the generic requirements may be commonly satisfied. Here, each device type defined for each use case is referred to as a redcap device type. Case B) includes the case of grouping several similar use cases in terms of requirements and supporting them in the form of a single UE. Each of these redcap device types may support some predefined or specific combination of redcap UE features. If multiple redcap device types are defined and redcap use cases are supported, there is an advantage in that specific redcap use cases can be supported through a more optimized redcap UE in terms of cost and power consumption. For example, the IWS use case can be supported through a very small, inexpensive, and power-efficient UE.

In the present disclosure, reduced capability may include meaning of reduced/low complexity/cost, reduced bandwidth, etc.

In case of Case B), that is, in a case of supporting redcap use cases in a plurality of device types, the following method may be considered to classify redcap device types. The following methods can also be applied to Case A), that is, to distinguish a redcap device from an NR UE.

In order to support an operation of a redcap UE distinguished from an NR UE, a redcap UE may need to report its own device type information to a base station.

Figure 10:
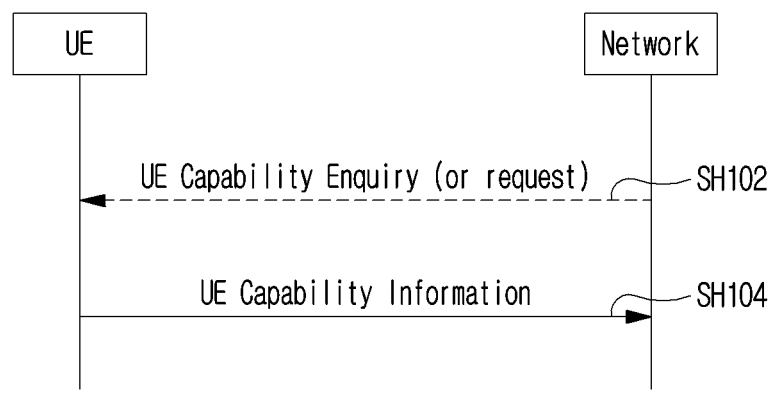
FIG. 10 illustrates a procedure of reporting a device type of a redcap device in a wireless communication system to which the present disclosure may be applied.

FIG. 10 illustrates a procedure for reporting a device type of a redcap device in a wireless communication system to which the present disclosure may be applied.

In FIG. 10, a reporting procedure may (re)use the UE capability transfer procedure defined in TS 38.331 as follows, a base station may acquire redcap device type information through reception of UE capability information and use the acquired device information when scheduling a corresponding UE.

Referring to FIG. 10, the base station/network performs a capability inquiry/request to a UE in the RRC_CONNECTED state (SH102). The UE includes redcap device type information in UE capability information and transmits it to the base station/network (SH104).

Classification Method 1

Redcap device types can be classified based on one of the main requirements. Main requirements that can be criteria for classification may be, for example, supported max data rate (peak bit rate), latency, mobility (stationary/fixed, portable, mobile, etc.), battery lifetime, complexity, coverage, etc. For each classified redcap device type, UE feature(s) (combination) that must be supported mandatorily or can be optionally supported can be defined in the specification. This may be to reduce overhead of separately signaling whether or not features are supported for each device type.

Redcap device type information included in UE capability information and reported by a UE to a base station/network may be, for example, transmitted to a base station through a specific field (e.g., RedCapDeviceType) of a UE-NR-Capability information element (IE). For example, when classified as redcap device type 1, 2, . . . , a value of the RedCapDeviceType field may be expressed as integers such as 1, 2, . . . , or a combination of characters and integers such as r1, r2, . . . . In this way, a UE reports the device type and parameters related thereto by including one field in the capability information, therefore this method has advantages in terms of signaling overhead.

Example) Method of classifying redcap device types based on supported max data rate and reporting to a base station The supported max data rate of the NR terminal is determined by the equation shown in Table 8 below in TS 38.306. Table 8 illustrates the TS 38.306 standard.

TABLE 8

4.1 Supported max data rate
4.1.1 General
The DL and UL max data rate supported by the UE is calculated by band or band combinations supported by the UE. A UE supporting NR (NR SA, MR-DC) shall support the calculated DL and UL max data rate defined in 4.1.2.
4.1.2 Supported max data rate for DL/UL
For NR, the approximate data rate for a given number of aggregated carriers in a band or band combination is computed as follows.

$$\text{data rate(in Mbps)} = 10^{-6} \cdot \sum_{j=1}^{J\Sigma} \left( v_{Layers}^{(j)} \cdot Q_m^{(j)} \cdot f^{(j)} \cdot R \frac{N_{PRB}^{BW(j),\mu} \cdot 12}{T_s^{\mu}} (1 - OH^{(j)})_{max}() \right)$$

wherein
    J is the number of aggregated component carriers in a band or band combination
    $R_{max} = 948/1024$
    For the j-th CC,
        $v_{Layers}^{(j)}$ is the maximum number of supported layers given by higher layer parameter maxNumberMIMO-LayersPDSCH for downlink and maximum of higher layer parameters maxNumberMIMO-LayersCB-PUSCH and maxNumberMIMO-LayersNonCB-PUSCH for uplink.
        $Q_m^{(j)}$ is the maximum supported modulation order given by higher layer parameter supportedModulationOrderDL for downlink and higher layer parameter supportedModulationOrderUL for uplink.
        $f^{(j)}$ the scaling factor given by higher layer parameter scalingFactor and can take the values 1, 0.8, 0.75, and 0.4.
        μ is the numerology (as defined in TS 38.211 [6])
        $T_s^{\mu}$ is the average OFDM symbol duration in a subframe for numerology μ, i.e. $T_s^{\mu} = 10^{-3}/(14 \cdot 2^{\mu})$. Note that normal cyclic prefix is assumed.
        $N_{PRB}^{BW(j),\mu}$ is the maximum RB allocation in bandwidth $BW^{(j)}$ with numerology μ, as defined in 5.3 TS 38.101-1 [2] and 5.3 TS 38.101-2 [3], where $BW^{(j)}$ is the UE supported maximum bandwidth in the given band or band combination.
        $OH^{(j)}$ is the overhead and takes the following values
            0.14, for frequency range FRI for DL
            0.18, for frequency range FR2 for DL
            0.08, for frequency range FRI for UL
            0.10, for frequency range FR2 for UL
NOTE 1: Only one of the UL or SUL carriers (the one with the higher data rate) is counted for a cell operating SUL.
The approximate maximum data rate can be computed as the maximum of the approximate data rates computed using the above formula for each of the supported band or band combinations.
For single carrier NR SA operation, the UE shall support a data rate for the carrier that is no smaller than the data rate computed using the above formula, with J = 1 CC and component $v_{Layers}^{(j)} \cdot Q_m^{(j)} \cdot f^{(j)}$ is no smaller than 4.
    NOTE: As an example, the value 4 in the component above can correspond to $v_{Layers}^{(j)} = 1$, $Q_m^{(j)} = 4$ and $f^{(j)} = 1$.
For EUTRA in case of MR-DC, the approximate data rate for a given number of aggregated carriers in a band or band combination is computed as follows.

$$\text{Data rate(in Mbps)} = 10^{-3} \cdot \sum_{j=1}^{J} TBS_j$$

wherein
    J is the number of aggregated EUTRA component carriers in MR-DC band combination
    $TBS_j$ is the total maximum number of DL-SCH transport block bits received or the total maximum number of UL-SCH transport block bits transmitted, within a 1ms TTI for j-th CC, as derived from TS36.213 [19] based on the UE supported maximum MIMO layers for the j-th CC, and based on the maximum modulation order for the j-th CC and number of PRBs based on the bandwidth of the j-th CC according to indicated UE capabilities.

TABLE 8-continued

The approximate maximum data rate can be computed as the maximum of the approximate data rates computed using the above formula for each of the supported band or band combinations.
For MR-DC, the approximate maximum data rate is computed as the sum of the approximate maximum data rates from NR and EUTRA.

---

Here, a UE reports parameters necessary for an equation for calculating a supported max data rate to be supported by an NR UE in the RRC_CONNECTED state according to a request of a base station.

The following illustrates these parameters and RRC IEs including the corresponding parameters.

FeatureSetDownlink IE: scalingFactor
FeatureSetDownlinkPerCC IE: maxNumberMIMO-LayersPDSCH, supportedModulationOrderDL, supportedBandwidthDL, supportedSubCarrierSpacingDL
FeatureSetUplink IE: scalingFactor
FeatureSetUplinkPerCC IE: maxNumberMIMO-LayersCB-PUSCH, maxNumberMIMO-LayersNonCB-PUSCH, supportedModulationOrderUL, supportedBandwidthUL, supportedSubCarrierSpacingUL In the case of a Redcap UE, in the case of a method of classifying a redcap device type based on a supported max data rate, values of the above parameters for each device type are defined in advance in the standard, and a UE sets a value of the RedCapDeviceType field of the UE-NR-Capability IE to a specific value to indicate a base station with the above parameter information along with the redcap device type information. Compared to the conventional operation in which an NR UE transmits the above parameters to a base station by including the above parameters in UE capability information, signaling overhead reduction can be expected by a redcap UE reporting the device type and the parameters related thereto through one field. A base station can obtain the device type, a supported max data rate, and values of the parameters listed above through the value of the RedCapDeviceType field and use them for UE scheduling.

Classification Method 2

Alternatively, rather than classifying the redcap device type based on the main requirement, the redcap device type may be classified based on UE feature(s) (combination) that must be supported mandatorily or can be optionally supported. This may be a more appropriate method when the features that need to be supported or can be supported for each use case are clear. The UE feature (s) (combination of) predefined in the standard for each Redcap device type is referred to as a feature set, among them, a feature set that must be mandatorily supported for each device type will be referred to as a mandatory feature set of the corresponding device type or defining the device type. In this method, a definition of a redcap device type may not be specified in the standard, which may mean that the above redcap use cases are supported as separate terminal types supporting different feature sets.

In the case of the above method, a redcap UE may report the redcap device type or use case(s) supported by the UE to a base station by reporting a predefined feature set to the base station. This may be a method more suitable for supporting various use cases through various optional features without distinguishing a separate UE category. The above feature set may be substituted with a combination of capability parameters, that is, a capability parameter set. The above feature set may be a mandatory feature set defined in the standard in advance for each redcap device type. For the above operation, a set of candidate features for a redcap device (type), that is, a feature pool may be previously defined or set in the standard. A redcap device may report a mandatory feature set defined for each type to a base station based on its own type. A UE may additionally report an optional feature set to a base station in addition to the mandatory feature set. A UE can perform an additional operation or a more optimized operation for a specific use case by additionally selecting and reporting an optional feature set. For example, in the case of a device type for a surveillance camera use case, in the case where a wired power supply UE and a power supply UE through a battery coexist, the mandatory feature set does not include a power saving feature and may be designated as an optional feature. Therefore, it can be selectively supported according to the detailed form of a terminal and reported to a base station in case of support. A base station can determine whether a feature is supported through the presence or absence of the corresponding parameter in the feature set reported by a redcap UE, and can reflect it when scheduling the corresponding UE.

Classification Method 3

Alternatively, the Redcap device type may be classified based on a combination of capability parameter(s). A combination of capability parameters that classify redcap device types may be parameters that determine the above redcap requirements. For example, the capability parameter for determining the redcap device type may be a bandwidth, a modulation order, the number of MIMO layers, etc. supported by a UE that determine the supported max data rate requirement supported by the UE. The values of the above parameters may be a list of actually supportable values or may be the maximum value among supported values.

Example) Capability Parameter(s) that Determines the Redcap Device Type

Supported Bandwidth ($N_{RB}$): (max) UE channel bandwidth or (max) UE transmission bandwidth; RB units Supported modulation order ($Q_m$): $Q_m=2$ for QPSK; 4 for 16 QAM; 6 for 64 QAM; etc.

Number of supported MIMO layers ($N_L$): can be substituted with the number of antennas ($N_a$)

A combination of capability parameters that determine a Redcap device type will be referred to as a capability parameter set of the corresponding device type. Redcap device type may be defined by classifying capability parameter set value(s) in ascending order (or descending order) of supported max data rate, for example. The example below is an example of defining M device types in ascending order of the supported max data rate.

Redcap device type classification according to capability parameter set value(s) (example):
Device Type 1: $\{N_L, N_{RB}, Q_m\}=\{1, 25, 2\}$
Device Type 2: $\{N_L, N_{RB}, Q_m\}=\{1, 25, 4\}$, or $\{1, 52, 2\}$
Device Type 3: $\{N_L, N_{RB}, Q_m\}=\{1, 52, 4\}$, or $\{1, 106, 2\}$
Device Type 4: $\{N_L, N_{RB}, Q_m\}=\{1, 106, 4\}$, or $\{2, 106, 2\}$
Device Type 5: $\{N_L, N_{RB}, Q_m\}=\{1, 106, 6\}$
Device Type 6: $\{N_L, N_{RB}, Q_m\}=\{2, 106, 4\}$
Device Type 7: $\{N_L, N_{RB}, Q_m\}=\{2, 106, 6\}$
. . .

Device Type M: $\{N_L, N_{RB}, Q_m\}=\{X, Y, Z\}$

For example, $N_{RB}$ value may use one of the values (maximum number of RBs that can be configured for each UE channel bandwidth) defined in Table 9 below in the case of NR FR1 (Frequency Range 1, i.e., a band of 6 GHz or less). The above example is a value according to subcarrier spacing (SCS)=15 kHz criterion, if a redcap device supports SCS=30 kHz and a cell to be connected uses SCS=30 kHz for data transmission, the $N_{RB}$ value based on SCS=15 kHz in the above example may be substituted with a value corresponding to SCS=30 kHz with reference to Table 9 below.

Table 9 illustrates a maximum transmission bandwidth configuration ($N_{RB}$) for each SCS in NR FR1.

TABLE 9

| SCS (kHz) | 5 MHz $N_{RB}$ | 10 MHz $N_{RB}$ | 15 MHz $N_{RB}$ | 20 MHz $N_{RB}$ |
|---|---|---|---|---|
| 15 | 25 | 52 | 79 | 106 |
| 30 | 11 | 24 | 38 | 51 |

In the case of device type 2/3/4 in the device type classification example, it corresponds to a case where one device type is defined with a plurality of capability set values. When device types are classified based on the supported max data rate as above, multiple capability parameter set values defining one device type may mean combinations supporting the same or similar supported max data rate.

Device type(s) that can be supported for each use case can be defined as follows using the device type(s) defined in the above example, and based on the supportable device type(s), a base station may limit cell access or perform subscription-based barring.

Example) Supportable device type(s) for each use case:
Industrial Wireless Sensor (IWS): device types 1 and 2
Video Surveillance: Device Types 2, 3
Wearables: device types 4, 5, 6, 7

Meanwhile, in order to avoid an increase in cost due to market segmentation due to excessive segmentation of device types, the number M of device types may be limited. As an extreme example, if M=1 is restricted, a redcap UE is not divided into multiple device types, that is, a single device type can support all of the above target use cases. As another example, if M=3 is restricted, device types that can be supported by device type classification and use case can be defined as follows.

Example) Classification of device type according to capability set value(s) (Example: In case of M=3):
Device Type 1: $\{N_L, N_{RB}, Q_m\}=\{1, 25, 2\}$ (or $\{1, 25, 4\}$ or $\{1, 52, 2\}$)
Device Type 2: $\{N_L, N_{RB}, Q_m\}=\{1, 52, 4\}$ or $\{1, 106, 2\}$
Device Type 3: $\{N_L, N_{RB}, Q_m\}=\{2, 106, 6\}$
Example) Supportable device type(s) for each use case (Example: M=3 case)
IWS: Device types 1
Video Surveillance: Device types 3
Wearables: Device types 7

Redcap UE's bandwidth capability, that is, a UE max bandwidth, may be determined as a minimum bandwidth that satisfies a bit rate required by the target use case. UE max bandwidth reduction can be expected to reduce a cost of a radio frequency (RF) device and/or baseband processing, and also reduce power consumption. Here, considering that a device manufacturing cost is determined by a peak rate or supported max data rate rather than a average bit rate or reference bit rate, a required bit rate may mean a peak rate or a supported max data rate. When determining a max bandwidth supporting a required bit rate, specific values may be assumed for other parameters (eg, the number of antennas ($N_L$), modulation order ($Q_m$), etc.) that determine a required bit rate. For example, in the case of Device Type 3 in the above example, a peak rate of about ~28 MHz can be supported, and here, a required max bandwidth is 20 MHz (106 RBs) assuming $\{N_L=1, Q_m=2\}$, and 10 MHz (52 RBs) assuming $\{N_L=1, Q_m=2\}$. Or, in the case of $\{N_L=2, Q_m=4\}$, it may be 5 MHz (25 RBs).

Device Type 3: $\{N_L, N_{RB}, Q_m\}=\{1, 52, 4\}$, or $\{1, 106, 2\}$

Within a max UE bandwidth of a Redcap UE, transmission/reception can be performed with transmission bandwidth allocated by network configuration using RRC signaling, etc.

A UE min bandwidth may be defined as a minimum value among NR UE channel bandwidths (or transmission bandwidths) greater than or greater than or equal to an NR SSB bandwidth.

Example) In FR1, 5 MHz for NR SSB with UE min bandwidth=SCS=15 kHz; 10 MHz for NR SSB with SCS=30 kHz
Example) In FR2, 40 MHz for NR SSB with UE min bandwidth=SCS=120 kHz; 80 MHz for NR SSB with SCS=240 kHz This may be to support access to an NR cell through an NR SSB while implementing low power consumption by supporting a service with a small required bit rate with a minimum bandwidth.

Classification Method 4

Considering that bandwidth capability of a Redcap UE is determined by a required bit rate of each use case, a Redcap device type may be classified based on UE bandwidth capability. Bandwidth capability that determines a Redcap device type may indicate, for example, supported bandwidth (NRB), that is, (max) UE channel bandwidth or (max) UE transmission bandwidth in RB units. Alternatively, it may be a minimum UE channel bandwidth or a minimum UE transmission bandwidth. More specifically, the following classifications are possible.

Classification method 4-1) It is classified by Max bandwidth, and an actual data transmission/reception bandwidth (<=max bandwidth) is configured and used Classification method 4-2) It is classified by Min bandwidth, and an actual data transmission/reception bandwidth (>=min bandwidth) is configured and used.

Classification method 4-3) One or multiple supportable bandwidths (sets) are defined for each device type, and an actual data transmission/reception bandwidth is configured and used within a corresponding bandwidth (set)

For the classification method 4-1/2/3, a max bandwidth can be limited to a value smaller than an NR bandwidth (e.g., 20 MHz), and a min bandwidth may be greater than or equal to an SSB bandwidth (e.g., in the case of 15 kHz SSB, 5 MHz).

Hereinafter, the present disclosure proposes a method of configuring a separate initial DL BWP and initial UL BWP for a specific type of terminal (e.g., the above-described redcap UE) based on the above-described description.

Hereinafter, in a description of the present disclosure, a general terminal means a terminal which supports all capabilities required by a wireless communication system (e.g., a NR system) and a specific type of terminal means a terminal which supports a specific requirement and/or specific feature(s) and/or a specific use case among all capabilities required by the wireless communication system, e.g., redcap UE. Hereinafter, in a description of the present disclosure, it may be referred to as redcap UE for convenience of a description, but it is just one example and the present disclosure is not limited thereto, and redcap UE may be interpreted as a specific type of terminal.

First, a method of configuring/supporting an initial DL BWP for a specific type of terminal is described.

A separate initial DL BWP for a specific type of terminal (e.g., RedCap UE) may be configured for offloading when a high traffic load occurs within an initial DL BWP for a non-specific type of terminal (i.e., a general terminal, e.g., non-redcap UE). A separate initial DL BWP may be also configured to align a center frequency of an initial DL BWP and initial UL BWPs in an unpaired spectrum. In addition, a separate initial DL BWP may be used to solve a concern about a potential increase in a PDCCH blocking rate due to a higher aggregation level (AL) which may be required especially for a specific type of terminal having 1 Rx branch (e.g., RedCap UE). In addition, when information volume of a system information block (SIB) needed to support a specific type of terminal (e.g., RedCap UE) is shared with UE, not a specific type of terminal (e.g., RedCap UE), it may cause some congestion problems in an initial DL BWP. For the above-described reasons, it is desirable to support a separate initial DL BWP for a specific type of terminal (e.g., RedCap UE). The above-described synchronization is applied to FDD as well as TDD, so a separate initial DL BWP for a specific type of terminal (e.g., RedCap UE) may be applied to both TDD and FDD.

A method of configuring a separate initial DL BWP for a specific type of terminal (e.g., RedCap UE) in a SIB is described.

For example, a new IE, e.g., BWP-DownlinkCommon (or, BWP-DownlinkCommon-R), used to configure common parameters of a downlink BWP for a specific type of terminal (e.g., RedCap UE) in system information block 1 (SIB1) may be defined and through it, a separate initial DL BWP may be configured.

Figure 11:
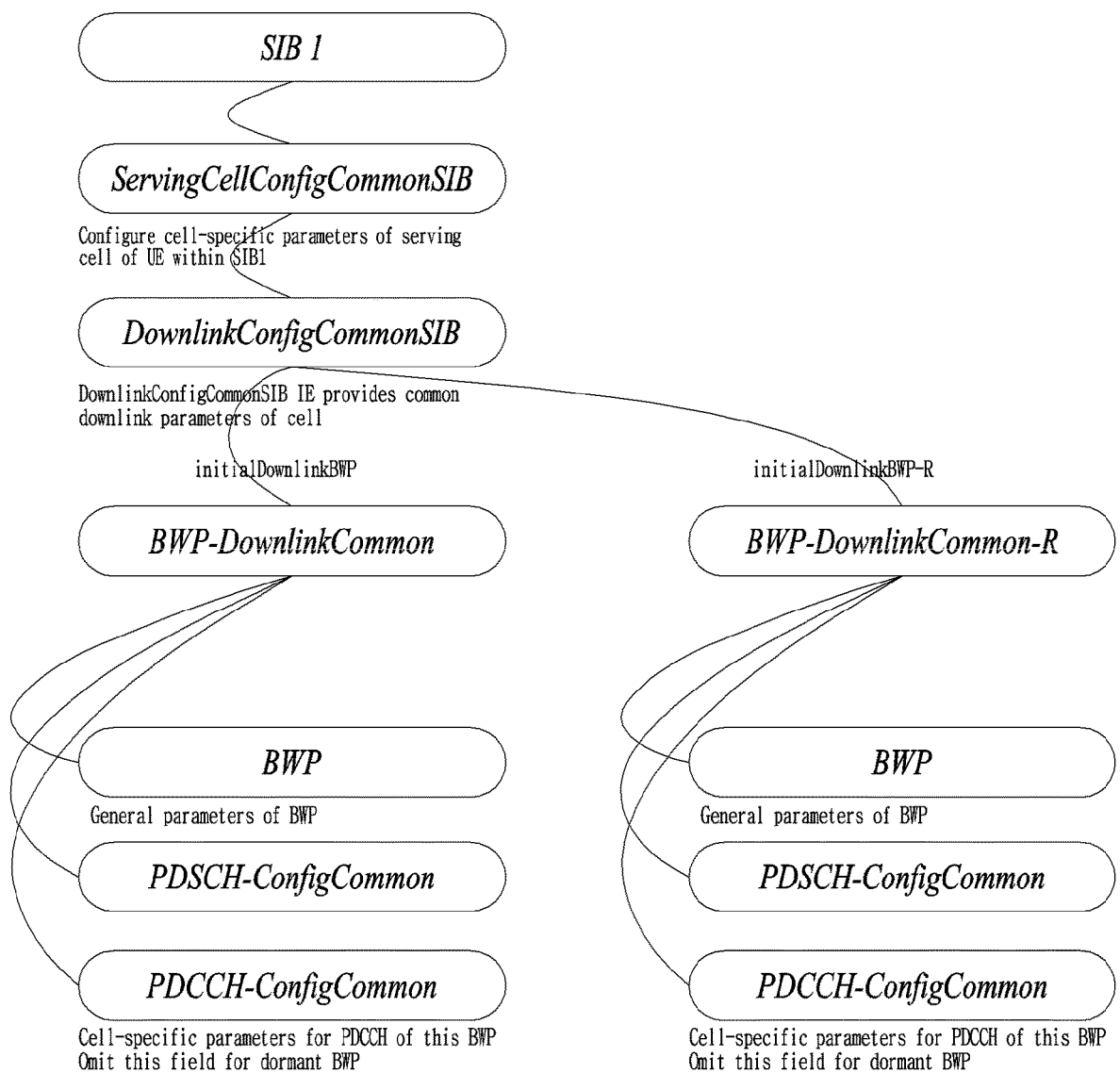
FIG. 11 illustrates a signaling structure which configures a separate initial DL BWP for a specific type of terminal according to an embodiment of the present disclosure.

FIG. 11 illustrates a signaling structure which configures a separate initial DL BWP for a specific type of terminal according to an embodiment of the present disclosure.

In reference to FIG. 11, as a new IE, BWP-DownlinkCommon-R, is added, a separate initial DL BWP for a specific type of terminal (e.g., RedCap UE) may be configured in SIB1. For example, SIB1 may include ServingCellConfigCommonSIB, an IE for configuring cell-specific parameters for a serving cell of UE. In addition, DownlinkConfigCommonSIB, an IE for configuring common downlink parameters of a cell, may be included in ServingCellConfigCommonSIB IE. In addition, BWP-DownlinkCommon, an IE used to configure common parameters of a downlink BWP for a non-specific type of terminal (i.e., a general terminal, e.g., non-redcap UE), may be included in DownlinkConfigCommonSIB and BWP-DownlinkCommon-R, an IE used to configure common parameters of a downlink BWP for a specific type of terminal (e.g., RedCap UE), may be also included in DownlinkConfigCommonSIB.

Both BWP-DownlinkCommon and BWP-DownlinkCommon-R may include i) a BWP, an IE for configuring generic parameters for a BWP, ii) PDSCH-ConfigCommon, an IE for configuring cell-specific parameters for a PDSCH of a corresponding BWP, iii) PDCCH-ConfigCommon, an IE for configuring cell-specific parameters for a PDCCH of a corresponding BWP.

Here, some parameters/IEs may be omitted in a BWP-DownlinkCommon-R IE in order to minimize a signaling overhead. In other words, one or more of some parameters/IEs overlapped in a BWP-DownlinkCommon IE and a BWP-DownlinkCommon-R IE may be omitted in BWP-DownlinkCommon-R IE. In this case, a specific type of terminal (e.g., RedCap UE) may assume/apply the same value as configured for an initial DL BWP of a non-specific type of terminal (e.g., non-redcap UE) in SIB1 for an omitted parameter/IE. In other words, for some parameters/IEs omitted in a BWP-DownlinkCommon-R IE, it may be assumed that a specific type of terminal (e.g., RedCap UE) is configured to be the same as a value configured for corresponding parameters/IEs in a BWP-DownlinkCommon IE (i.e., the same value may be applied).

For example, a base station may configure only locationAndBandwidth, a parameter indicating a BWP position and a bandwidth in a BWP IE in a BWP-DownlinkCommon IE. In other words, parameters for a SCS and CP value for an initial DL BWP in a BWP-DownlinkCommon-R IE may be omitted. In this case, a specific type of terminal (e.g., RedCap UE) may assume/apply the same SCS and CP value configured for an initial DL BWP in a BWP IE in a BWP-DownlinkCommon IE for a non-specific type of terminal (e.g., non-redcap UE) to a separate initial DL BWP.

In another example, a separate initial DL BWP (i.e., separate parameters for it) for a specific type of terminal (e.g., RedCap UE) may be configured in BWP-DownlinkCommon, the existing IE used to configure common parameters of a downlink BWP for a non-specific type of terminal (e.g., non-redcap UE) in SIB1.

As separate parameter(s) for a specific type of terminal (e.g., RedCap UE) are added in the existing BWP-DownlinkCommon, a separate initial DL BWP for a specific type of terminal (e.g., RedCap UE) may be configured in SIB1. For example, SIB1 may include ServingCellConfigCommonSIB, an IE for configuring cell-specific parameters for a serving cell of UE. In addition, DownlinkConfigCommonSIB, an IE for configuring common downlink parameters of a cell, may be included in a ServingCellConfigCommonSIB IE. In addition, BWP-DownlinkCommon, an IE used to configure common parameters of a downlink BWP for a general terminal, may be included in DownlinkConfigCommonSIB. Here, separate parameter(s) for a specific type of terminal (e.g., RedCap UE) in a BWP-DownlinkCommon IE may be added. For example, a BWP IE for a specific type of terminal (e.g., RedCap UE) in the existing BWP-DownlinkCommon IE may be configured and locationAndBandwidth-R for a specific type of terminal (e.g., RedCap UE) in a BWP IE may be separately configured.

Here, some parameters/IEs for a specific type of terminal (e.g., RedCap UE) may be omitted in a BWP-DownlinkCommon IE in order to minimize a signaling overhead. In this case, a specific type of terminal (e.g., RedCap UE) may assume/apply the same value as configured for an initial DL BWP of a non-specific type of terminal (e.g., non-redcap UE) in SIB1 for an omitted parameter/IE.

For example, a base station may include only locationAndBandwidth-R, a parameter indicating a BWP position and a bandwidth for a specific type of terminal (e.g., RedCap UE) in a BWP IE in a BWP-DownlinkCommon IE. In other words, a value for subcarrier spacing (SCS) or a cyclic prefix (CP) for a separate initial DL BWP for a specific type of terminal (e.g., RedCap UE) may not be configured. In this case, a specific type of terminal (e.g., RedCap UE) may assume/apply values of a parameter for a CP (cyclicPrefix) and a parameter for the same SCS (subcarrierSpacing) configured in an initial DL BWP for a non-specific type of terminal (e.g., non-redcap UE).

For example, in reference to the following table 10, a specific type of terminal (e.g., RedCap UE) may refer to locationAndBandwidth-R, subcarrierSpacing, cyclicPrefix for generic parameters of a separate initial DL BWP for a specific type of terminal (e.g., RedCap UE). In other words, a frequency and a position for a separate initial DL BWP are separately configured, but they may be configured to be the same as a non-specific type of terminal (e.g., non-redcap UE) for SCS and a CP.

TABLE 10

```
BWP ::=                     SEQUENCE{
    locationAndBandwidth    INTEGER (0..37949),
    locationAndBandwidth-R  INTEGER (0..37949),
    subcarrierSpacing       SubcarrierSpacing,
    cyclicPrefix            ENUMERATED { extended }   OPTIONAL
}
```

Hereinafter, a method of configuring a CORESET and a common search space set(s)(CSS) for a specific type of terminal (e.g., RedCap UE) is proposed.

In an inactive/idle mode (or state), a separate initial DL BWP for a specific type of terminal (e.g., RedCap UE) may be used for random access and paging for a specific type of terminal (e.g., RedCap UE). A system information (SI) message for a specific type of terminal (e.g., RedCap UE) may be also transmitted in a separate initial DL BWP for a specific type of terminal (e.g., RedCap UE).

For example, a CORESET/a CSS in a separate initial DL BWP for a specific type of terminal (e.g., RedCap UE) may be configured in a SIB. In an inactive/idle mode (or state), for random access, a CORESET/a CSS for random access may be configured in a separate initial DL BWP for a specific type of terminal (e.g., RedCap UE).

For example, PDCCH-ConfigCommon (e.g., PDCCH-ConfigCommon-R), an IE for configuring cell-specific parameters for a PDCCH for a specific type of terminal (e.g., RedCap UE) in SIB1, may be defined and through it, a CORESET/a CSS in a separate initial DL BWP may be configured.

More specifically, a CORESET/a CSS for random access in a separate initial DL BWP for a specific type of terminal (e.g., RedCap UE) may be configured as a PDCCH-ConfigCommon-R IE for a specific type of terminal (e.g., RedCap UE) is added in SIB1. For example, SIB1 may include ServingCellConfigCommonSIB, an IE for configuring cell-specific parameters for a serving cell of UE. In addition, DownlinkConfigCommonSIB, an IE for configuring common downlink parameters of a cell, may be included in a ServingCellConfigCommonSIB IE. In addition, BWP-DownlinkCommon, an IE used to configure common parameters of a downlink BWP for a general terminal, may be included in DownlinkConfigCommonSIB. In addition, PDCCH-ConfigCommon-R for configuring cell-specific parameters for a PDCCH for a specific type of terminal (e.g., RedCap UE) may be included in a BWP-DownlinkCommon IE.

Here, some parameters/IEs in a BWP-DownlinkCommon IE may be omitted to minimize a signaling overhead. In this case, a specific type of terminal (e.g., RedCap UE) may assume/apply the same value configured for an initial DL BWP of a non-specific type of terminal (e.g., non-redcap UE) in SIB1 for an omitted parameter/IE.

TABLE 11

```
PDCCH-ConfigCommon-R ::=          SEQUENCE {
    controlResourceSetZero            ControlResourceSetZero   OPTIONAL,
-- Cond InitialBWP-Only
    commonControlResourceSet          ControlResourceSet   OPTIONAL,
-- Need R
    searchSpaceZero                   SearchSpaceZero   OPTIONAL,
-- Cond InitialBWP-Only
    commonSearchSpaceList             SEQUENCE (SIZE(1..4)) OF
SearchSpace   OPTIONAL,   -- Need R
    searchSpaceSIB1                   SearchSpaceId   OPTIONAL,
-- Need S
    searchSpaceOtherSystemInformation SearchSpaceId   OPTIONAL,
-- Need S
    pagingSearchSpace                 SearchSpaceId   OPTIONAL,
-- Need S
    ra-SearchSpace                    SearchSpaceId   OPTIONAL,
-- Need S
    ...,
    ...
}
```

In another example, separate parameter(s) for a specific type of terminal (e.g., RedCap UE) may be configured in the existing PDCCH-ConfigCommon IE in SIB1.

A CORESET/a CSS for random access in a separate initial DL BWP for a specific type of terminal (e.g., RedCap UE) may be configured by adding separate parameter(s)/IE (s) for a specific type of terminal (e.g., RedCap UE) in the existing PDCCH-ConfigCommon IE in SIB1. For example, SIB1 may include ServingCellConfigCommonSIB, an IE for configuring cell-specific parameters for a serving cell of UE. In addition, DownlinkConfigCommonSIB, an IE for configuring common downlink parameters of a cell, may be included in ServingCellConfigCommonSIB IE. In addition, BWP-DownlinkCommon, an IE used to configure common parameters of a downlink BWP for a general terminal, may be included in DownlinkConfigCommonSIB. In addition, PDCCH-ConfigCommon for configuring cell-specific parameters for a PDCCH may be included in a BWP-DownlinkCommon IE. Here, a PDCCH-ConfigCommon IE may include a parameter for a specific type of terminal (e.g., RedCap UE), e.g., a parameter for a search space for random access (ra-SearchSpace-R).

Here, some parameters in a PDCCH-ConfigCommon IE may be omitted to minimize a signaling overhead. In this case, a specific type of terminal (e.g., RedCap UE) may assume/apply the same values as configured for an initial DL BWP of a non-specific type of terminal (e.g., non-redcap UE) in SIB1 for omitted parameters. For example, a base station may include only ra-SearchSpace-R in a PDCCH-ConfigCommon IE. In this case, a specific type of terminal (e.g., RedCap UE) may assume/apply a configuration for the same CORESET #0 (controlResourceSetZero) or a configuration for search space #0 (searchSpaceZero) in an initial DL BWP for a non-specific type of terminal (e.g., non-redcap UE).

For paging in an idle/inactive mode, a CORESET/a CSS for paging may be configured in a separate initial DL BWP for a specific type of terminal (e.g., RedCap UE). In this case, the same CORESET/CSS configuration method as the above-described random access may be also applied to paging in an idle/inactive mode.

For random access in an idle/inactive mode, when a CORESET/a CSS for random access is not configured in a separate initial DL BWP for a specific type of terminal (e.g., RedCap UE), a specific type of terminal (e.g., RedCap UE) may switch a separate initial DL BWP for a specific type of terminal (e.g., RedCap UE) into an initial DL BWP for a non-specific type of terminal (e.g., non-redcap UE) and use CORSET #0 and search space (SS) monitoring occasions (MO) configured by a MIB for random access.

Similarly, for random access in an idle/inactive mode, when a CORESET/a CSS for paging is not configured in a separate initial DL BWP for a specific type of terminal (e.g., RedCap UE), a specific type of terminal (e.g., RedCap UE) may switch a separate initial DL BWP for a specific type of terminal (e.g., RedCap UE) into an initial DL BWP for a non-specific type of terminal (e.g., non-redcap UE) and use CORSET #0 and search space (SS) monitoring occasions (MO) configured by a MIB for paging.

Next, a method of configuring/supporting an initial UL BWP for a specific type of terminal is described.

A separate initial UL BWP for a specific type of terminal (e.g., RedCap UE) is required to support the following reasons. A separate initial UL BWP for a specific type of terminal (e.g., RedCap UE) may be configured for offloading when a high traffic load occurs within an initial UL BWP for a non-specific type of terminal (i.e., a general terminal, e.g., non-redcap UE). In addition, it may be also used to alleviate an UL resource fragmentation problem caused by coexistence of a specific type of terminal (e.g., RedCap UE) and a non-specific type of terminal (e.g., non-redcap UE) in the same frequency band. Other synchronization is to minimize an effect on a non-specific type of terminal (e.g., non-redcap UE) when a coverage recovery technology such as repetition of a Msg3 PUSCH for a random access procedure is applied only to a specific type of terminal (e.g., RedCap UE).

For the reason, it is desirable to support a separate initial UL BWP for a specific type of terminal (e.g., RedCap UE). Meanwhile, a center frequency alignment principle between a separate UL BWP and an initial DL BWP for a specific type of connected (separate) terminal (e.g., RedCap UE) should be maintained to avoid a negative effect on power consumption/complexity/cost and performance of a specific type of terminal (e.g., RedCap UE).

A method of configuring a separate initial UL BWP for a specific type of terminal (e.g., RedCap UE) in a SIB is described.

For example, a new IE, e.g., BWP-UplinkCommon (or, BWP-UplinkCommon-R), used to configure common parameters of an uplink BWP for a specific type of terminal (e.g., RedCap UE) in SIB1 may be defined and through it, a separate initial UL BWP may be configured.

Figure 12:
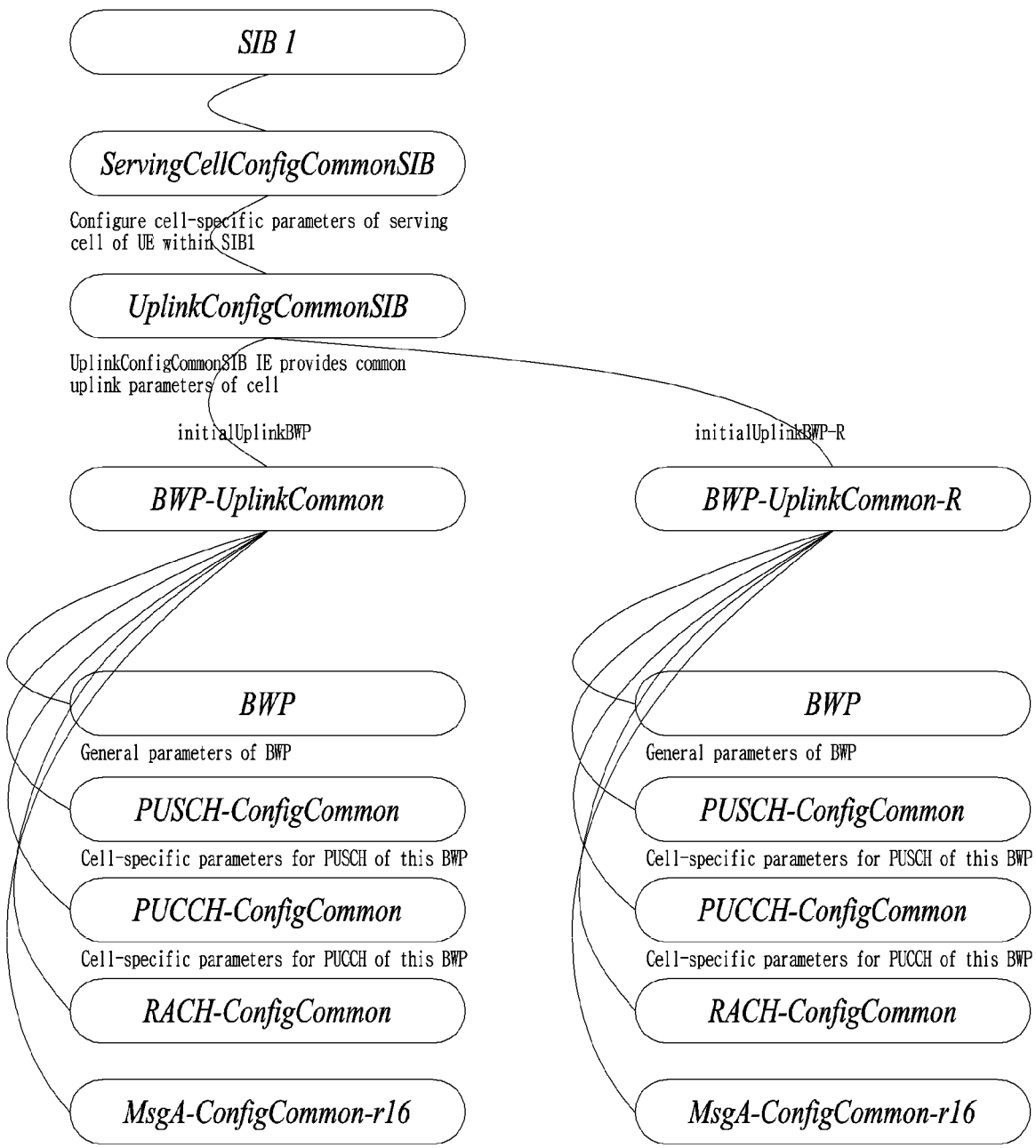
FIG. 12 illustrates a signaling structure which configures a separate initial UL BWP for a specific type of terminal according to an embodiment of the present disclosure.

FIG. 12 illustrates a signaling structure which configures a separate initial UL BWP for a specific type of terminal according to an embodiment of the present disclosure.

In reference to FIG. 12, as a new IE, BWP-UplinkCommon-R, is added, a separate initial UL BWP for a specific type of terminal (e.g., RedCap UE) may be configured in SIB1. For example, SIB1 may include ServingCellConfigCommonSIB, an IE for configuring cell-specific parameters for a serving cell of UE. In addition, UplinkConfigCommonSIB, an IE for configuring common uplink parameters of a cell, may be included in a ServingCellConfigCommonSIB IE. In addition, BWP-UplinkCommon, an IE used to configure common parameters of an uplink BWP for a non-specific type of terminal (i.e., a general terminal, e.g., non-redcap UE), may be included in UplinkConfigCommonSIB and BWP-UplinkCommon-R, an IE used to configure common parameters of an uplink BWP for a specific type of terminal (e.g., RedCap UE), may be also included in UplinkConfigCommonSIB.

Both BWP-UplinkCommon and BWP-UplinkCommon-R may include i) a BWP, an IE for configuring generic parameters for a BWP, ii) PUSCH-ConfigCommon, an IE for configuring cell-specific parameters for a PUSCH of a corresponding BWP, iii) PUCCH-ConfigCommon, an IE for configuring cell-specific parameters for a PUCCH of a corresponding BWP, iv) RACH-ConfigCommon, an IE used to specify cell-specific random access parameters, v) MsgA-ConfigCommon, an IE used to configure a PRACH and PUSCH resource for transmission of MsgA in a 2-step random access type procedure.

Here, some parameters/IEs may be omitted in a BWP-UplinkCommon-R IE in order to minimize a signaling overhead. In other words, one or more of some parameters/IEs overlapped in a BWP-UplinkCommon IE and a BWP-UplinkCommon-R IE may be omitted in a BWP-UplinkCommon-R IE. In this case, a specific type of terminal (e.g., RedCap UE) may assume/apply the same value as configured for an initial UL BWP of a non-specific type of terminal (e.g., non-redcap UE) in SIB1 for an omitted parameter/IE. In other words, for some parameters/IEs omitted in a BWP-UplinkCommon-R IE, it may be assumed that a specific type of terminal (e.g., RedCap UE) is configured to be the same as a value configured for corresponding parameters/IEs in a BWP-UplinkCommon IE (i.e., the same value may be applied).

For example, a base station may configure only locationAndBandwidth, a parameter indicating a BWP position and a bandwidth in a BWP IE in a BWP-UplinkCommon IE. In other words, parameters for a SCS and CP value for an initial UL BWP in a BWP-UplinkCommon-R IE may be omitted. In this case, a specific type of terminal (e.g., RedCap UE) may assume/apply the same SCS and CP value configured for an initial UL BWP in a BWP IE in a BWP-UplinkCommon IE for a non-specific type of terminal (e.g., non-redcap UE) to a separate initial UL BWP.

In another example, a separate initial UL BWP (i.e., separate parameters for it) for a specific type of terminal (e.g., RedCap UE) may be configured in BWP-UplinkCommon, the existing IE used to configure common parameters of an uplink BWP for a non-specific type of terminal (e.g., non-redcap UE) in SIB1.

As separate parameter(s) for a specific type of terminal (e.g., RedCap UE) are added in the existing BWP-UplinkCommon, a separate initial UL BWP for a specific type of terminal (e.g., RedCap UE) may be configured in SIB1. For example, SIB1 may include ServingCellConfigCommonSIB, an IE for configuring cell-specific parameters for a serving cell of UE. In addition, UplinkConfigCommonSIB, an IE for configuring common uplink parameters of a cell, may be included in a ServingCellConfigCommonSIB IE. In addition, BWP-UplinkCommon, an IE used to configure common parameters of an uplink BWP for a general terminal, may be included in UplinkConfigCommonSIB. Here, separate parameter(s) for a specific type of terminal (e.g., RedCap UE) in a BWP-UplinkCommon IE may be added. For example, a BWP IE for a specific type of terminal (e.g., RedCap UE) in the existing BWP-UplinkCommon IE may be configured and locationAndBandwidth-R for a specific type of terminal (e.g., RedCap UE) in a BWP IE may be separately configured.

Here, some parameters/IEs for a specific type of terminal (e.g., RedCap UE) may be omitted in a BWP-UplinkCommon IE in order to minimize a signaling overhead. In this case, a specific type of terminal (e.g., RedCap UE) may assume/apply the same value as configured for an initial UL BWP of a non-specific type of terminal (e.g., non-redcap UE) in SIB1 for an omitted parameter/IE.

For example, a base station may include only locationAndBandwidth-R, a parameter indicating a BWP position and a bandwidth for a specific type of terminal (e.g., RedCap UE) in a BWP IE in a BWP-UplinkCommon IE. In other words, a value for SCS and a CP for a separate initial UL BWP for a specific type of terminal (e.g., RedCap UE) may not be configured. In this case, a specific type of terminal (e.g., RedCap UE) may assume/apply values of a parameter for a CP (cyclicPrefix) or a parameter for the same SCS (subcarrierSpacing) configured in an initial UL BWP for a non-specific type of terminal (e.g., non-redcap UE).

For example, in reference to the following table 12, a specific type of terminal (e.g., RedCap UE) may refer to locationAndBandwidth-R, subcarrierSpacing, cyclicPrefix for generic parameters of a separate initial UL BWP for a specific type of terminal (e.g., RedCap UE). In other words, a frequency and a position for a separate initial UL BWP are separately configured, but they may be configured to be the same as a non-specific type of terminal (e.g., non-redcap UE) for SCS and a CP.

specific type of terminal (e.g., non-redcap UE) when there is a separate initial UL BWP, a separate initial DL BWP for a specific type of terminal (e.g., RedCap UE), if configured, needs to be the same as a separate initial UL BWP for a specific type of terminal (e.g., RedCap UE).

Hereinafter, an operation of a terminal according to whether an initial UL BWP is configured is described.

Hereinafter, an operation of a terminal according to whether an initial UL BWP for a specific type of terminal (e.g., RedCap UE) defined by the above-described method is separately configured is proposed.

By considering a payload size limit of SIB1, when a separate initial UL BWP for a specific type of terminal (e.g., RedCap UE) is configured, but a separate initial DL BWP for a specific type of terminal (e.g., RedCap UE) is not configured, it is useful to define an operation of a terminal, but the following operations are not applied only when a separate initial DL BWP for a specific type of terminal (e.g., RedCap UE) is not configured.

When a separate initial DL BWP for a specific type of terminal (e.g., RedCap UE) is not configured, a specific type of terminal (e.g., RedCap UE) may assume CORESET #0 bandwidth configured by a MIB as an initial DL BWP. In this case, a center frequency between a separate initial UL BWP and initial DL BWP for a specific type of terminal (e.g., RedCap UE) may be aligned or not. However, in order to minimize frequency retuning for a specific type of terminal (e.g., RedCap UE), some limits may be applied to a possible configuration of a separate initial UL BWP for a specific type of terminal (e.g., RedCap UE). In other words, a specific type of terminal (e.g., RedCap UE) may expect/assume that a center frequency of a (separate) initial UL BWP will be aligned with a center frequency of a separate initial DL BWP (if configured) for a corresponding specific type of terminal (e.g., RedCap UE) and otherwise (i.e., when a separate initial DL BWP is not configured), it may expect/assume that it will be aligned with a center frequency of CORESET #0 configured by a MIB.

Alternatively, when a separate initial DL BWP for a specific type of terminal (e.g., RedCap UE) is not configured, a specific type of terminal (e.g., RedCap UE) may assume an initial DL BWP configured by a SIB for a non-specific type of terminal (e.g., non-redcap UE) (if configured) or otherwise (i.e., when an initial DL BWP is not configured by a SIB) CORESET #0 bandwidth configured by a MIB as an initial DL BWP. In this case, a specific type of terminal (e.g., RedCap UE) may expect/assume that a center frequency of a (separate) initial UL BWP will be aligned with a center frequency of an initial DL BWP configured by a SIB for a non-specific type of terminal (e.g., non-redcap UE) (if configured) or otherwise (i.e., when an

TABLE 12

| BWP ::= | SEQUENCE { |
| --- | --- |
| locationAndBandwidth | INTEGER (0..37949), |
| locationAndBandwidth-R | INTEGER (0..37949), |
| subcarrierSpacing | SubcarrierSpacing, |
| cyclicPrefix | ENUMERATED { extended } OPTIONAL |
| } | |

In addition, in order to align a center frequency of an initial UL and DL BWP in a TDD (i.e., an unpaired spectrum), for a specific type of terminal (e.g., RedCap UE), if a center frequency of a corresponding initial UL BWP is configured differently from an initial DL BWP of a noninitial DL BWP is not configured by a SIB) CORESET #0 bandwidth configured by a MIB.

In other words, a specific type of terminal (e.g., RedCap UE) may expect/assume that a center frequency of an initial UL BWP (e.g., a separate initial UL BWP (if configured) or an initial UL BWP of a non-specific type of terminal (e.g., non-redcap UE)) will be aligned with a center frequency of an initial DL BWP (i.e., it may expect/assume that it will be configured to be aligned). In other words, a specific type of terminal (e.g., RedCap UE) may expect/assume that regardless of whether its initial UL BWP and initial DL BWP are separately configured only for a specific type of terminal (e.g., RedCap UE), a center frequency of an initial UL BWP will be aligned with a center frequency of an initial DL BWP (i.e., it may expect/assume that it will be configured to be aligned).

Hereinafter, an operation of a terminal according to whether a PRACH occasion (RO) is configured in an initial UL BWP separately configured for a specific type of terminal (e.g., RedCap UE) is described.

In a separate initial UL BWP for a specific type of terminal (e.g., RedCap UE), a specific type of terminal (e.g., RedCap UE) may be configured as a PRACH configuration (e.g., a RO) dedicated to a specific type of terminal (e.g., RedCap UE) or shared with a non-specific type of terminal (e.g., non-redcap UE). In addition, it may be guaranteed that PRACH configurations of a separate initial UL BWP for a specific type of terminal (e.g., RedCap UE) belongs to a RACH occasion (RO) associated with the best SSB within the maximum bandwidth of a specific type of terminal (e.g., RedCap UE) due to a configuration of a base station. In other words, when a separate initial UL BWP for a specific type of terminal (e.g., RedCap UE) is configured, a RACH occasion (RO) associated with the highest SSB such as a RSRP, etc. may belong in a corresponding separate initial UL BWP due to a terminal.

When a RO is configured for a separate initial UL BWP for a specific type of terminal (e.g., RedCap UE), a specific type of terminal (e.g., RedCap UE) may perform a random access procedure on (by using) a separate initial UL BWP for a specific type of terminal (e.g., RedCap UE). In other words, a specific type of terminal (e.g., RedCap UE) may transmit to a base station Msg1 (i.e., a random access preamble)/Msg3 (for a 4-step random access procedure), MsgA (i.e., a PRACH and a PUSCH) (for a 2-step random access procedure) on (by using) a corresponding separate initial UL BWP.

In addition, when a CORESET/a CSS for a random access procedure in an initial DL BWP for a specific type of terminal (e.g., RedCap UE) is configured, a specific type of terminal (e.g., RedCap UE) may be switched into a separate initial DL BWP for Msg2/Msg4 reception. In other words, when a CORESET/a CSS for a random access procedure in a separate initial DL BWP for a specific type of terminal (e.g., RedCap UE) is configured, a specific type of terminal (e.g., RedCap UE) may perform a random access procedure on (by using) a separate initial DL BWP for a specific type of terminal (e.g., RedCap UE). In other words, when a CORESET/a CSS for monitoring a PDCCH having DCI scheduling a PDSCH carrying Msg2 (i.e., a random access response)/Msg4 (for a 4-step random access procedure), MsgB (i.e., a random access response) (for a 2-step random access procedure) is configured for a separate initial DL BWP for a specific type of terminal (e.g., RedCap UE), Msg2 (i.e., a random access response)/Msg4 (for a 4-step random access procedure), MsgB (i.e., a random access response) (for a 2-step random access procedure) may be received from a base station in a corresponding initial DL BWP.

On the other hand, When a RO is not configured for a separate initial UL BWP for a specific type of terminal (e.g., RedCap UE), a specific type of terminal (e.g., RedCap UE) may switch a separate initial UL BWP for a specific type of terminal (e.g., RedCap UE) into an initial UL BWP for a non-specific type of terminal (e.g., non-redcap UE). In other words, when a separate initial UL BWP for a specific type of terminal (e.g., RedCap UE) is not configured or when a separate initial UL BWP for a specific type of terminal (e.g., RedCap UE) is configured, but a RO in a corresponding initial UL BWP is not configured, a specific type of terminal (e.g., RedCap UE) may perform a random access procedure on (by using) an initial UL BWP for a non-specific type of terminal (e.g., non-redcap UE). In other words, a specific type of terminal (e.g., RedCap UE) may transmit to a base station Msg1 (i.e., a random access preamble)/Msg3 (for a 4-step random access procedure), MsgA (i.e., a PRACH and a PUSCH) (for a 2-step random access procedure) on (by using) an initial UL BWP for a non-specific type of terminal (e.g., non-redcap UE). In this case, when a CORESET/a CSS for a random access procedure in an initial DL BWP for a specific type of terminal (e.g., RedCap UE) is configured, a specific type of terminal (e.g., RedCap UE) may switch a separate initial DL BWP for a specific type of terminal (e.g., RedCap UE) into an initial DL BWP for a non-specific type of terminal (e.g., non-redcap UE) (e.g., in order to align a center frequency between an initial UL BWP and an initial DL BWP).

In addition, when an initial DL BWP for a specific type of terminal (e.g., RedCap UE) is not configured or when a separate initial DL BWP for a specific type of terminal (e.g., RedCap UE) is configured, but a CORESET/a CSS for a random access procedure in a corresponding initial DL BWP is not configured, a specific type of terminal (e.g., RedCap UE) may perform a random access procedure on (by using) an initial DL BWP for a non-specific type of terminal (e.g., non-redcap UE). In other words, a specific type of terminal (e.g., RedCap UE) may receive from a base station Msg2 (i.e., a random access response)/Msg4 (for a 4-step random access procedure), MsgB (i.e., a random access response) (for a 2-step random access procedure) on (by using) an initial DL BWP for a non-specific type of terminal (e.g., non-redcap UE).

A separate initial DL BWP may be also configured to align a center frequency of an initial DL BWP and initial UL BWPs in an unpaired spectrum. In addition, a separate initial DL BWP may be used to solve a concern about a potential increase in a PDCCH blocking rate due to a higher aggregation level (AL) which may be necessary especially for a specific type of terminal having 1 Rx branch (e.g., RedCap UE). In addition, when information volume of a system information block (SIB) needed to support a specific type of terminal (e.g., RedCap UE) is shared with UE, not a specific type of terminal (e.g., RedCap UE), it may cause some congestion problems in an initial DL BWP. For the above-described reasons, it is desirable to support a separate initial DL BWP for a specific type of terminal (e.g., RedCap UE). The above-described synchronization is applied to FDD as well as TDD, so a separate initial DL BWP for a specific type of terminal (e.g., RedCap UE) may be applied to both TDD and FDD.

Figure 13:
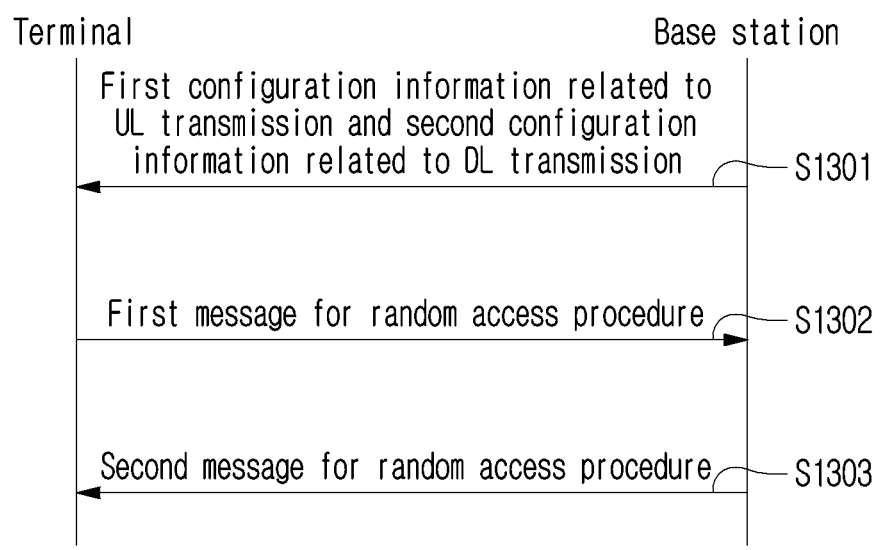
FIG. 13 is a diagram which illustrates a signaling procedure between a base station and a terminal for a method of performing a random access procedure according to an embodiment of the present disclosure.

FIG. 13 is a diagram which illustrates a signaling procedure between a base station and a terminal for a method of performing a random access procedure according to an embodiment of the present disclosure.

In FIG. 13, a signaling procedure between a terminal (UE: user equipment) and a base station (BS) based on the above-proposed methods is illustrated. An example of FIG. 13 is for convenience of a description, and it does not limit a scope of the present disclosure. Some step(s) illustrated in FIG. 13 may be omitted according to a situation and/or a configuration. In addition, in FIG. 13, a base station and a terminal are just one example, and may be implemented by a device illustrated in the following FIG. 16. For example, a processor 102/202 in FIG. 16 may be controlled to transmit and receive a channel/a signal/data/information, etc. by using a transceiver 106/206 and may be also controlled to store a channel/a signal/data/information, etc. which will be transmitted or received in a memory 104/204.

In addition, for an operation between a base station and a terminal in FIG. 13, the above-described contents may be referred to/used although not separately mentioned.

A base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station. In addition, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an ID). In an example, when one terminal is configured to perform transmission and reception with multiple TRPs (or cells), it may mean that multiple CORESET groups (or CORESET pools) are configured for one terminal. Such a configuration for a CORESET group (or a CORESET pool) may be performed through higher layer signaling (e.g., RRC signaling, etc.).

In reference to FIG. 13, signaling between a base station and a terminal is considered for convenience of a description, but it goes without saying that a corresponding signaling method may be extended and applied to signaling between multiple TRPs and multiple UE. In the following description, a base station may be interpreted as one TRP. Alternatively, a base station may include a plurality of TRPs or may be one cell which includes a plurality of TRPs.

In reference to FIG. 13, a specific type of terminal (e.g., redcap UE) receives first configuration information related to uplink transmission and second configuration information related to downlink transmission from a base station S1301.

Here, first configuration information may be UplinkConfigCommonSIB in the FIG. 12 and second configuration information may be DownlinkConfigCommonSIB in the FIG. 11. First configuration information and second configuration information may be transmitted individually, but may be also transmitted as one configuration information. For example, when first configuration information and second configuration information are included in one configuration information, the configuration information, for example, may correspond to the SIB1, ServingCellConfigCommonSIB.

In addition, first configuration information (e.g., UplinkConfigCommonSIB in FIG. 12) may include information on an initial UL BWP for a non-specific type of terminal (e.g., non-redcap UE) and additionally, it may further include information on an initial UL BWP for (dedicated to) a specific type of terminal (e.g., redcap UE). In other words, when an initial UL BWP for a specific type of terminal (e.g., redcap UE) is configured by the first configuration information, the first configuration information may individually include information on an initial UL BWP for a non-specific type of terminal (e.g., non-redcap UE) and information on an initial UL BWP for the specific type of terminal (e.g., redcap UE). Here, as described above, it may be considered/assumed that one or more parameters omitted in information on an initial UL BWP for a specific type of terminal (e.g., redcap UE) are configured to be the same as information on an initial UL BWP for the non-specific type of terminal (e.g., non-redcap UE).

In addition, second configuration information (e.g., DownlinkConfigCommonSIB in FIG. 11) may include information on an initial DL BWP for a non-specific type of terminal (e.g., non-redcap UE) and additionally, it may further include information on an initial DL BWP for (dedicated to) a specific type of terminal (e.g., redcap UE). In other words, when an initial DL BWP for a specific type of terminal (e.g., redcap UE) is configured by the second configuration information, the second configuration information may individually include information on an initial DL BWP for a non-specific type of terminal (e.g., non-redcap UE) and information on an initial DL BWP for the specific type of terminal (e.g., redcap UE). Here, described above, it may be considered/assumed that one or more parameters omitted in information on an initial DL BWP for a specific type of terminal (e.g., redcap UE) were configured to be the same as information on an initial DL BWP for the non-specific type of terminal (e.g., non-redcap UE).

Here, for an unpaired spectrum operation (i.e., a TDD operation), regardless of whether the initial UL BWP and the initial DL BWP are configured for a specific type of terminal (e.g., redcap UE), a center frequency of the initial DL BWP may be configured to be the same as a center frequency of the initial UL BWP. In other words, when an initial UL BWP and an initial DL BWP for a specific type of terminal (e.g., redcap UE) are configured, a center frequency of the initial UL BWP and the initial DL BWP may be aligned (equal). Alternatively, when only an initial UL BWP for a specific type of terminal (e.g., redcap UE) is configured, a center frequency (i.e., used by a specific type of terminal (e.g., redcap UE)) of the initial UL BWP and an initial DL BWP for a non-specific type of terminal (e.g., non-redcap UE) may be aligned (equal). Alternatively, when only an initial DL BWP for a specific type of terminal (e.g., redcap UE) is configured, a center frequency (i.e., used by a specific type of terminal (e.g., redcap UE)) of the initial DL BWP and an initial UL BWP for a non-specific type of terminal (e.g., non-redcap UE) may be aligned (equal). Alternatively, when both an initial UL BWP and an initial DL BWP for a specific type of terminal (e.g., redcap UE) are not configured, a center frequency (i.e., used by a specific type of terminal (e.g., redcap UE)) of an initial UL BWP and an initial DL BWP for a non-specific type of terminal (e.g., non-redcap UE) may be aligned (equal).

A specific type of terminal (e.g., redcap UE) transmits to a base station a first message for a random access procedure on an initial UL BWP S1302.

Here, a first message for a random access procedure may correspond to MSG1 (i.e., a PRACH or a random access preamble transmitted in a PRACH) and/or MSG3 (i.e., a PDSCH scheduled by random access response UL grant) for a 4-step random access procedure (refer to FIGS. 8A and 8B) and may correspond to MSGA (i.e., a PRACH and a PUSCH carrying a random access preamble) for a 2-step random access procedure (refer to FIGS. 9A and 9B).

Here, when an initial UL BWP for a specific type of terminal (e.g., redcap UE) is configured by first configuration information, the first message may be transmitted on an initial UL BWP for a specific type of terminal (e.g., redcap UE). On the other hand, when an initial UL BWP for a specific type of terminal (e.g., redcap UE) is not configured by first configuration information, the first message may be transmitted on an initial UL BWP for a non-specific type of terminal (e.g., non-redcap UE).

A specific type of terminal (e.g., redcap UE) receives from a base station a second message for a random access procedure on an initial DL BWP S1303.

Here, a second message for a random access procedure may correspond to MSG2 (i.e., a PDSCH, a PDCCH for a random access response) and/or MSG4 (i.e., a PDSCH for contention resolution) for a 4-step random access procedure (refer to FIGS. 8A and 8B) and may correspond to MSGB (i.e., a PUSCH scheduled by random access response UL grant and a PDSCH for contention resolution) for a 2-step random access procedure (refer to FIGS. 9A and 9B).

Here, when an initial DL BWP for a specific type of terminal (e.g., redcap UE) is configured by second configuration information, the second message may be transmitted on an initial DL BWP for a specific type of terminal (e.g., redcap UE). On the other hand, when an initial DL BWP for a specific type of terminal (e.g., redcap UE) is not configured by second configuration information, the second message may be transmitted on an initial DL BWP for a non-specific type of terminal (e.g., non-redcap UE).

Subsequently, for a 4-step random access procedure, as illustrated in FIGS. 8A and 8B, a transmission and reception operation of MSG3 and MSG4 may be performed.

Figure 14:
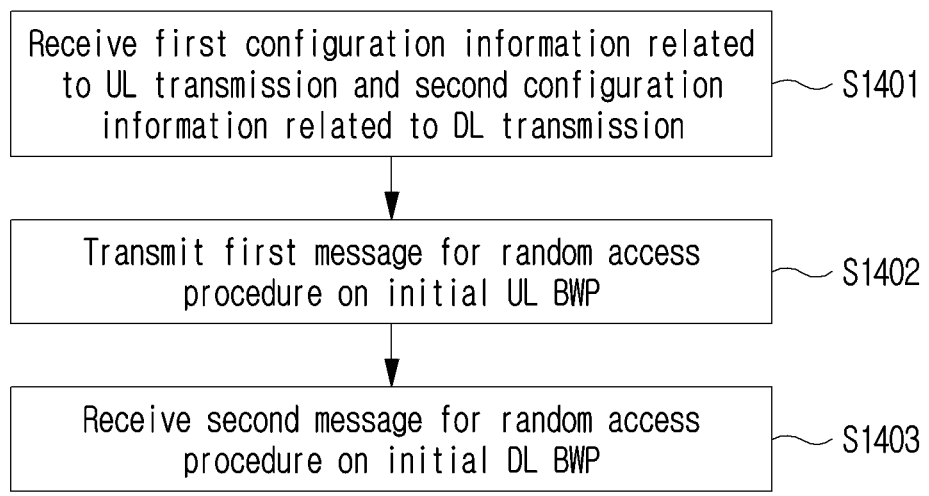
FIG. 14 is a diagram which illustrates an operation of a terminal for a method of performing a random access procedure according to an embodiment of the present disclosure.

FIG. 14 is a diagram which illustrates an operation of a terminal for a method of performing a random access procedure according to an embodiment of the present disclosure.

In FIG. 14, an operation of a terminal based on the above-proposed methods is illustrated. An example of FIG. 14 is for convenience of a description, and it does not limit a scope of the present disclosure. Some step(s) illustrated in FIG. 13 may be omitted according to a situation and/or a configuration. In addition, in FIG. 14, a terminal is just one example, and may be implemented by a device illustrated in the following FIG. 16. For example, a processor 102/202 in FIG. 16 may be controlled to transmit and receive a channel/a signal/data/information, etc. (e.g., RRC signaling, a MAC CE, DCI for UL/DL scheduling, a SRS, a PDCCH, a PDSCH, a PUSCH, a PUCCH, etc.) by using a transceiver 106/206 and may be controlled to store a channel/a signal/data/information, etc. which will be transmitted or received in a memory 104/204.

In reference to FIG. 14, a specific type of terminal (e.g., redcap UE) receives first configuration information related to uplink transmission and second configuration information related to downlink transmission from a base station S1401.

Here, first configuration information may be UplinkConfigCommonSIB in the FIG. 12 and second configuration information may be DownlinkConfigCommonSIB in the FIG. 11. First configuration information and second configuration information may be transmitted individually, but may be also transmitted as one configuration information. For example, when first configuration information and second configuration information are included in one configuration information, the configuration information, for example, may correspond to the SIB1, ServingCellConfigCommonSIB.

In addition, first configuration information (e.g., UplinkConfigCommonSIB in FIG. 12) may include information on an initial UL BWP for a non-specific type of terminal (e.g., non-redcap UE) and additionally, it may further include information on an initial UL BWP for (dedicated to) a specific type of terminal (e.g., redcap UE). In other words, when an initial UL BWP for a specific type of terminal (e.g., redcap UE) is configured by the first configuration information, the first configuration information may individually include information on an initial UL BWP for a non-specific type of terminal (e.g., non-redcap UE) and information on an initial UL BWP for the specific type of terminal (e.g., redcap UE). Here, as described above, it may be considered/assumed that one or more parameters omitted in information on an initial UL BWP for a specific type of terminal (e.g., redcap UE) are configured to be the same as information on an initial UL BWP for the non-specific type of terminal (e.g., non-redcap UE).

In addition, second configuration information (e.g., DownlinkConfigCommonSIB in FIG. 11) may include information on an initial DL BWP for a non-specific type of terminal (e.g., non-redcap UE) and additionally, it may further include information on an initial DL BWP for (dedicated to) a specific type of terminal (e.g., redcap UE). In other words, when an initial DL BWP for a specific type of terminal (e.g., redcap UE) is configured by the second configuration information, the second configuration information may individually include information on an initial DL BWP for a non-specific type of terminal (e.g., non-redcap UE) and information on an initial DL BWP for the specific type of terminal (e.g., redcap UE). Here, as described above, it may be considered/assumed that one or more parameters omitted in information on an initial DL BWP for a specific type of terminal (e.g., redcap UE) are configured to be the same as information on an initial DL BWP for the non-specific type of terminal (e.g., non-redcap UE).

Here, for an unpaired spectrum operation (i.e., a TDD operation), regardless of whether the initial UL BWP and the initial DL BWP are configured for a specific type of terminal (e.g., redcap UE), a center frequency of the initial DL BWP may be configured to be the same as a center frequency of the initial UL BWP. In other words, when an initial UL BWP and an initial DL BWP for a specific type of terminal (e.g., redcap UE) are configured, a center frequency of the initial UL BWP and the initial DL BWP may be aligned (equal). Alternatively, when only an initial UL BWP for a specific type of terminal (e.g., redcap UE) is configured, a center frequency (i.e., used by a specific type of terminal (e.g., redcap UE)) of the initial UL BWP and an initial DL BWP for a non-specific type of terminal (e.g., non-redcap UE) may be aligned (equal). Alternatively, when only an initial DL BWP for a specific type of terminal (e.g., redcap UE) is configured, a center frequency (i.e., used by a specific type of terminal (e.g., redcap UE)) of the initial DL BWP and an initial UL BWP for a non-specific type of terminal (e.g., non-redcap UE) may be aligned (equal). Alternatively, when both an initial UL BWP and an initial DL BWP for a specific type of terminal (e.g., redcap UE) are not configured, a center frequency (i.e., used by a specific type of terminal (e.g., redcap UE)) of an initial UL BWP and an initial DL BWP for a non-specific type of terminal (e.g., non-redcap UE) may be aligned (equal).

A specific type of terminal (e.g., redcap UE) transmits to a base station a first message for a random access procedure on an initial UL BWP S1402.

Here, a first message for a random access procedure may correspond to MSG1 (i.e., a PRACH or a random access preamble transmitted in a PRACH) and/or MSG3 (i.e., a PDSCH scheduled by random access response UL grant) for a 4-step random access procedure (refer to FIGS. 8A and 8B) and may correspond to MSGA (i.e., a PRACH and a PUSCH carrying a random access preamble) for a 2-step random access procedure (refer to FIGS. 9A and 9B).

Here, when an initial UL BWP for a specific type of terminal (e.g., redcap UE) is configured by first configuration information, the first message may be transmitted on an initial UL BWP for a specific type of terminal (e.g., redcap UE). On the other hand, when an initial UL BWP for a specific type of terminal (e.g., redcap UE) is not configured by first configuration information, the first message may be transmitted on an initial UL BWP for a non-specific type of terminal (e.g., non-redcap UE).

A specific type of terminal (e.g., redcap UE) receives from a base station a second message for a random access procedure on an initial DL BWP S1403.

Here, a second message for a random access procedure may correspond to MSG2 (i.e., a PDSCH, a PDCCH for a random access response) and/or MSG4 (i.e., a PDSCH for contention resolution) for a 4-step random access procedure (refer to FIGS. 8A and 8B) and may correspond to MSGB (i.e., a PUSCH scheduled by random access response UL grant and a PDSCH for contention resolution) for a 2-step random access procedure (refer to FIGS. 9A and 9B).

Here, when an initial DL BWP for a specific type of terminal (e.g., redcap UE) is configured by second configuration information, the second message may be transmitted on an initial DL BWP for a specific type of terminal (e.g., redcap UE). On the other hand, when an initial DL BWP for a specific type of terminal (e.g., redcap UE) is not configured by second configuration information, the second message may be transmitted on an initial DL BWP for a non-specific type of terminal (e.g., non-redcap UE).

Subsequently, for a 4-step random access procedure, as illustrated in FIGS. 8A and 8B, a transmission and reception operation of MSG3 and MSG4 may be performed.

Figure 15:
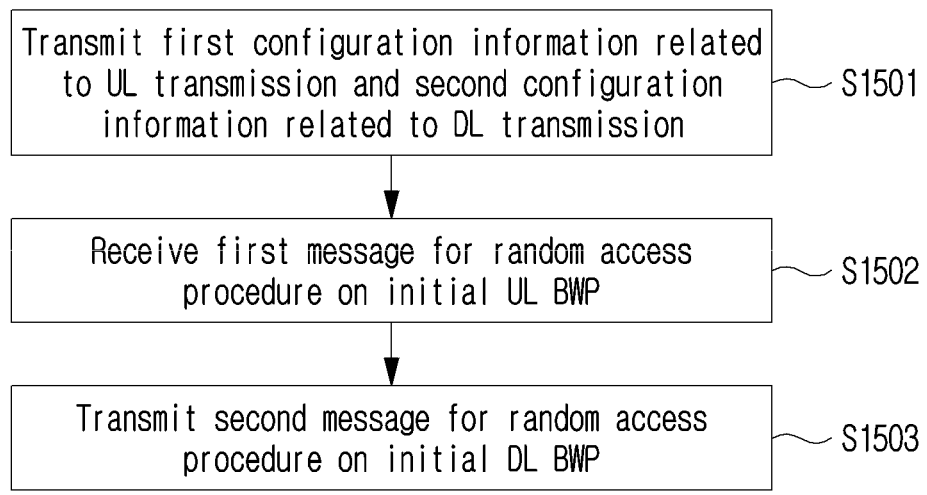
FIG. 15 is a diagram which illustrates an operation of a base station for a method of performing a random access procedure according to an embodiment of the present disclosure.

FIG. 15 is a diagram which illustrates an operation of a base station for a method of performing a random access procedure according to an embodiment of the present disclosure.

In FIG. 15, an operation of a base station based on the above-proposed methods is illustrated. An example of FIG. 14 is for convenience of a description, and it does not limit a scope of the present disclosure. Some step(s) illustrated in FIG. 15 may be omitted according to a situation and/or a configuration. In addition, in FIG. 15, a base station is just one example, and may be implemented by a device illustrated in the following FIG. 16. For example, a processor 102/202 in FIG. 16 may be controlled to transmit and receive a channel/a signal/data/information, etc. (e.g., RRC signaling, a MAC CE, DCI for UL/DL scheduling, a SRS, a PDCCH, a PDSCH, a PUSCH, a PUCCH, etc.) by using a transceiver 106/206 and may be controlled to store a channel/a signal/data/information, etc. which will be transmitted or received in a memory 104/204.

In reference to FIG. 15, a base station transmits first configuration information related to uplink transmission and second configuration information related to downlink transmission to a specific type of terminal (e.g., redcap UE) from a base station S1501.

Here, first configuration information may be UplinkConfigCommonSIB in the FIG. 12 and second configuration information may be DownlinkConfigCommonSIB in the FIG. 11. First configuration information and second configuration information may be transmitted individually, but may be also transmitted as one configuration information. For example, when first configuration information and second configuration information are included in one configuration information, the configuration information, for example, may correspond to the SIB1, ServingCellConfigCommonSIB.

In addition, first configuration information (e.g., UplinkConfigCommonSIB in FIG. 12) may include information on an initial UL BWP for a non-specific type of terminal (e.g., non-redcap UE) and additionally, it may further include information on an initial UL BWP for (dedicated to) a specific type of terminal (e.g., redcap UE). In other words, when an initial UL BWP for a specific type of terminal (e.g., redcap UE) is configured by the first configuration information, the first configuration information may individually include information on an initial UL BWP for a non-specific type of terminal (e.g., non-redcap UE) and information on an initial UL BWP for the specific type of terminal (e.g., redcap UE). Here, as described above, it may be considered/assumed that one or more parameters omitted in information on an initial UL BWP for a specific type of terminal (e.g., redcap UE) are configured to be the same as information on an initial UL BWP for the non-specific type of terminal (e.g., non-redcap UE).

In addition, second configuration information (e.g., DownlinkConfigCommonSIB in FIG. 11) may include information on an initial DL BWP for a non-specific type of terminal (e.g., non-redcap UE) and additionally, it may further include information on an initial DL BWP for (dedicated to) a specific type of terminal (e.g., redcap UE). In other words, when an initial DL BWP for a specific type of terminal (e.g., redcap UE) is configured by the second configuration information, the second configuration information may individually include information on an initial DL BWP for a non-specific type of terminal (e.g., non-redcap UE) and information on an initial DL BWP for the specific type of terminal (e.g., redcap UE). Here, as described above, it may be considered/assumed that one or more parameters omitted in information on an initial DL BWP for a specific type of terminal (e.g., redcap UE) are configured to be the same as information on an initial DL BWP for the non-specific type of terminal (e.g., non-redcap UE).

Here, for an unpaired spectrum operation (i.e., a TDD operation), regardless of whether the initial UL BWP and the initial DL BWP are configured for a specific type of terminal (e.g., redcap UE), a center frequency of the initial DL BWP may be configured to be the same as a center frequency of the initial UL BWP. In other words, when an initial UL BWP and an initial DL BWP for a specific type of terminal (e.g., redcap UE) are configured, a center frequency of the initial UL BWP and the initial DL BWP may be aligned (equal). Alternatively, when only an initial UL BWP for a specific type of terminal (e.g., redcap UE) is configured, a center frequency (i.e., used by a specific type of terminal (e.g., redcap UE)) of the initial UL BWP and an initial DL BWP for a non-specific type of terminal (e.g., non-redcap UE) may be aligned (equal). Alternatively, when only an initial DL BWP for a specific type of terminal (e.g., redcap UE) is configured, a center frequency (i.e., used by a specific type of terminal (e.g., redcap UE)) of the initial DL BWP and an initial UL BWP for a non-specific type of terminal (e.g., non-redcap UE) may be aligned (equal). Alternatively, when both an initial UL BWP and an initial DL BWP for a specific type of terminal (e.g., redcap UE) are not configured, a center frequency (i.e., used by a specific type of terminal (e.g., redcap UE)) of an initial UL BWP and an initial DL BWP for a non-specific type of terminal (e.g., non-redcap UE) may be aligned (equal).

A base station receives a first message for a random access procedure on an initial UL BWP from a specific type of terminal (e.g., redcap UE) S1502.

Here, a first message for a random access procedure may correspond to MSG1 (i.e., a PRACH or a random access preamble transmitted in a PRACH) and/or MSG3 (i.e., a PDSCH scheduled by random access response UL grant) for a 4-step random access procedure (refer to FIGS. 8A and 8B) and may correspond to MSGA (i.e., a PRACH and a PUSCH carrying a random access preamble) for a 2-step random access procedure (refer to FIGS. 9A and 9B).

Here, when an initial UL BWP for a specific type of terminal (e.g., redcap UE) is configured by first configuration information, the first message may be transmitted on an initial UL BWP for a specific type of terminal (e.g., redcap UE). On the other hand, when an initial UL BWP for a specific type of terminal (e.g., redcap UE) is not configured by first configuration information, the first message may be transmitted on an initial UL BWP for a non-specific type of terminal (e.g., non-redcap UE).

A base station transmits a second message for a random access procedure on an initial DL BWP to a specific type of terminal (e.g., redcap UE) S1503.

Here, a second message for a random access procedure may correspond to MSG2 (i.e., a PDSCH, a PDCCH for a random access response) and/or MSG4 (i.e., a PDSCH for contention resolution) for a 4-step random access procedure (refer to FIGS. 8A and 8B) and may correspond to MSGB (i.e., a PUSCH scheduled by random access response UL grant and a PDSCH for contention resolution) for a 2-step random access procedure (refer to FIGS. 9A and 9B).

Here, when an initial DL BWP for a specific type of terminal (e.g., redcap UE) is configured by second configuration information, the second message may be transmitted on an initial DL BWP for a specific type of terminal (e.g., redcap UE). On the other hand, when an initial DL BWP for a specific type of terminal (e.g., redcap UE) is not configured by second configuration information, the second message may be transmitted on an initial DL BWP for a non-specific type of terminal (e.g., non-redcap UE).

Subsequently, for a 4-step random access procedure, as illustrated in FIGS. 8A and 8B, a transmission and reception operation of MSG3 and MSG4 may be performed.

General Device to which the Present Disclosure may be applied

Figure 16:
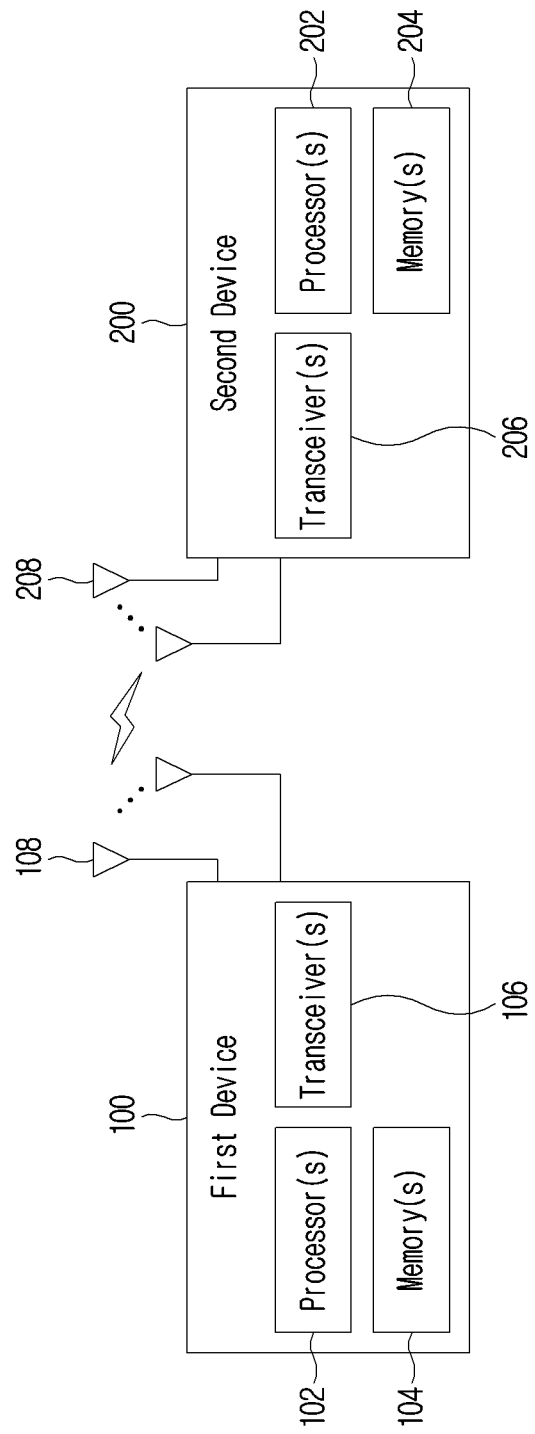
FIG. 16 illustrates a block diagram of a wireless communication device according to an embodiment of the present disclosure.

FIG. 16 is a diagram which illustrates a block diagram of a wireless communication device according to an embodiment of the present disclosure.

In reference to FIG. 16, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a reduced capability (redcap) user equipment (UE) in a wireless communication system, the method comprising:
receiving, from a base station, first configuration information related to uplink (UL) transmission and second configuration information related to downlink (DL) transmission, wherein the first configuration information includes information regarding an initial UL bandwidth part (BWP) and the second configuration information includes information regarding an initial DL BWP;
transmitting, to the base station, a physical random access channel (PRACH), wherein:
(i) based on the first configuration information further including information regarding a redcap-specific initial UL BWP in addition to the information regarding the initial UL BWP, the redcap-specific initial UL BWP is used for transmitting the PRACH instead of the initial UL BWP, and
(ii) based on the first configuration information not including the information regarding a redcap-specific initial UL BWP, the initial UL BWP is used for transmitting the PRACH; and
receiving, from the base station, a physical downlink control channel (PDCCH), wherein:
(i) based on the second configuration information further including information regarding a redcap-specific initial DL BWP in addition to the information regarding the initial DL BWP, the redcap-specific initial DL BWP is used for receiving the PDCCH instead of the initial DL BWP, and
(ii) based on the second configuration information not including the information regarding a redcap-specific initial DL BWP, the initial DL BWP is used for receiving the PDCCH,
wherein for an unpaired spectrum operation, a center frequency of a DL BWP used for receiving the PDCCH among the initial DL BWP and the redcap-specific initial DL BWP is configured to be the same as a center frequency of a UL BWP used for transmitting the PRACH among the initial UL BWP and the redcap-specific initial UL BWP.

2. The method of claim 1,
wherein one or more parameters omitted in the information regarding a redcap-specific initial UL BWP is considered configured to be the same as the information regarding an initial UL BWP.

3. The method of claim 1,
wherein one or more parameters omitted in the information regarding a redcap-specific initial DL BWP is considered configured to be the same as the information regarding an initial DL BWP.

4. A reduced capability (redcap) user equipment (UE) configured to operate in a wireless communication system, the redcap UE comprising:
at least one transceiver for transmitting and receiving a wireless signal; and
at least one processor controlling the at least one transceiver,
wherein the at least one processor is configured to:
receive, from a base station, first configuration information related to uplink (UL) transmission and second configuration information related to downlink (DL) transmission from a base station, wherein the first configuration information includes information regarding an initial UL bandwidth part (BWP) and the second configuration information includes information regarding an initial DL BWP;
transmit, to the base station, a physical random access channel (PRACH), wherein:
(i) based on the first configuration information further including information regarding a redcap-specific initial UL BWP in addition to the information regarding the initial UL BWP, the redcap-specific initial UL BWP is used for transmitting the PRACH instead of the initial UL BWP, and
(ii) based on the first configuration information not including the information regarding a redcap-specific initial UL BWP, the initial UL BWP is used for transmitting the PRACH; and
receive, from the base station, a physical downlink control channel (PDCCH), wherein:
(i) based on the second configuration information further including information regarding a redcap-specific initial DL BWP in addition to the information regarding the initial DL BWP, the redcap-specific initial DL BWP is used for receiving the PDCCH instead of the initial DL BWP, and
(ii) based on the second configuration information not including the information regarding a redcap-specific initial DL BWP, the initial DL BWP is used for receiving the PDCCH,
wherein for an unpaired spectrum operation, a center frequency of a DL BWP used for receiving the PDCCH among the initial DL BWP and the redcap-specific initial DL BWP is configured to be the same as a center frequency of a UL BWP used for transmitting the PRACH among the initial UL BWP and the redcap-specific initial UL BWP.

5. A base station configured to operate in a wireless communication system, the base station comprising:
- at least one transceiver for transmitting and receiving a wireless signal; and
- at least one processor controlling the at least one transceiver, wherein the at least one processor is configured to:

transmit, to a reduced capability (redcap) user equipment (UE), first configuration information related to uplink (UL) transmission and second configuration information related to downlink (DL) transmission, wherein the first configuration information includes information regarding an initial UL bandwidth part (BWP) and the second configuration information includes information regarding an initial DL BWP;

receive, from the redcap UE, a physical random access channel (PRACH), wherein:
  (i) based on the first configuration information further including information regarding a redcap-specific initial UL BWP in addition to the information regarding the initial UL BWP, the redcap-specific initial UL BWP is used for transmitting the PRACH instead of the initial UL BWP, and
  (ii) based on the first configuration information not including the information regarding a redcap-specific initial UL BWP, the initial UL BWP is used for transmitting the PRACH; and transmit, to the redcap UE, a physical downlink control channel (PDCCH), wherein:
  (i) based on the second configuration information further including information regarding a redcap-specific initial DL BWP in addition to the information regarding the initial DL BWP, the redcap-specific initial DL BWP is used for receiving the PDCCH instead of the initial DL BWP, and
  (ii) based on the second configuration information not including the information regarding a redcap-specific initial DL BWP, the initial DL BWP is used for receiving the PDCCH, wherein for an unpaired spectrum operation, a center frequency of a DL BWP used for transmitting the PDCCH among the initial DL BWP and the redcap-specific initial DL BWP is configured to be the same as a center frequency of a UL BWP used for receiving the PRACH among the initial UL BWP and the redcap-specific initial UL BWP.

\* \* \* \* \*